US010608348B2

(12) United States Patent
Bench et al.

(10) Patent No.: US 10,608,348 B2
(45) Date of Patent: Mar. 31, 2020

(54) DUAL ANTENNA SYSTEMS WITH VARIABLE POLARIZATION

(71) Applicants: Stephanie M. Bench, Carlsbad, CA (US); Mark S. Olsson, La Jolla, CA (US); Ray Merewether, La Jolla, CA (US); Ryan B. Levin, San Diego, CA (US)

(72) Inventors: Stephanie M. Bench, Carlsbad, CA (US); Mark S. Olsson, La Jolla, CA (US); Ray Merewether, La Jolla, CA (US); Ryan B. Levin, San Diego, CA (US)

(73) Assignee: SEESCAN, INC., San Diego, CA (US)

(*) Notice: Subject to any disclaimer, the term of this patent is extended or adjusted under 35 U.S.C. 154(b) by 508 days.

(21) Appl. No.: 13/851,951

(22) Filed: Mar. 27, 2013

(65) Prior Publication Data
US 2014/0111376 A1 Apr. 24, 2014

Related U.S. Application Data

(60) Provisional application No. 61/618,746, filed on Mar. 31, 2012, provisional application No. 61/786,385, filed on Mar. 15, 2013.

(51) Int. Cl.
| | |
|---|---|
| *G01S 19/13* | (2010.01) |
| *H01Q 21/24* | (2006.01) |
| *H01Q 1/27* | (2006.01) |
| *G01S 19/22* | (2010.01) |
| *G01S 5/02* | (2010.01) |
| *H01Q 9/44* | (2006.01) |

(Continued)

(52) U.S. Cl.
CPC .......... *H01Q 21/24* (2013.01); *G01S 5/021* (2013.01); *G01S 5/0257* (2013.01); *G01S 5/0284* (2013.01); *G01S 19/13* (2013.01); *G01S 19/22* (2013.01); *G01S 19/36* (2013.01); *H01Q 1/273* (2013.01); *H01Q 9/44* (2013.01); *H01Q 21/26* (2013.01); *H01Q 25/001* (2013.01)

(58) Field of Classification Search
CPC .......... G01S 19/13; G01S 19/38; G01S 19/39
USPC ................................... 342/357.51
See application file for complete search history.

(56) References Cited

U.S. PATENT DOCUMENTS 3,503,075 A 3/1970 Gerst
4,030,100 A 6/1977 Perrotti
(Continued)

FOREIGN PATENT DOCUMENTS

WO PCT/US2013/034642 9/2014

OTHER PUBLICATIONS

Ahmed, Kamran, "Polarization," PowerPoint Presentation, 8 Pages Total, Lecture #7.
(Continued)

*Primary Examiner* — Vladimir Magloire
*Assistant Examiner* — Helena H Seraydaryan
(74) *Attorney, Agent, or Firm* — Steven C. Tietsworth, Esq.

(57) ABSTRACT

Antenna systems for receiving transmitted signals comprising at least a first tuned antenna disposed in a known relationship spatially with a second antenna, with the first tuned antenna electrically connected to the second antenna, are disclosed. The antenna system may be configured to allow the antennas to reliably discriminate between left-hand and right-hand polarized circular signals.

16 Claims, 27 Drawing Sheets

(51) Int. Cl.
*G01S 19/36* (2010.01)
*H01Q 21/26* (2006.01)
*H01Q 25/00* (2006.01)

(56) References Cited

U.S. PATENT DOCUMENTS

| | | | |
|---|---|---|---|
| 4,622,557 A | 11/1986 | Westerfield | |
| 4,641,366 A | 2/1987 | Yokoyama et al. | |
| 4,701,763 A | 10/1987 | Yamamoto et al. | |
| 4,754,283 A | 6/1988 | Fowler | |
| 4,804,969 A | 2/1989 | Blaese | |
| 4,894,663 A | 1/1990 | Urbish et al. | |
| 5,059,970 A | 10/1991 | Raubenheimer et al. | |
| 5,239,669 A | 8/1993 | Mason et al. | |
| 5,272,485 A | 12/1993 | Mason et al. | |
| 5,300,936 A | 4/1994 | Izadian | |
| 5,402,134 A | 3/1995 | Miller et al. | |
| 5,515,059 A | 5/1996 | How et al. | |
| 5,521,610 A | 5/1996 | Rodal | |
| 5,523,761 A | 6/1996 | Gildea | |
| 5,534,882 A | 7/1996 | Lopez | |
| 5,561,432 A | 10/1996 | Knight | |
| 5,563,612 A * | 10/1996 | Flood | G01S 5/0231 331/53 |
| 5,568,162 A | 10/1996 | Samsel et al. | |
| 5,570,097 A | 10/1996 | Aguado | |
| 5,592,173 A | 1/1997 | Lau et al. | |
| 5,604,506 A | 2/1997 | Rodal | |
| 5,625,365 A | 4/1997 | Tom et al. | |
| 5,650,792 A | 7/1997 | Moore et al. | |
| 5,654,717 A | 8/1997 | Nichols et al. | |
| 5,694,136 A | 12/1997 | Westfall | |
| 5,719,587 A | 2/1998 | Rodal | |
| 5,754,143 A | 5/1998 | Warnagiris et al. | |
| 5,760,909 A | 6/1998 | Nichols | |
| 5,818,390 A | 10/1998 | Hill | |
| 5,825,327 A | 10/1998 | Krasner | |
| 5,862,501 A | 1/1999 | Talbot et al. | |
| 5,864,318 A | 1/1999 | Cosenza et al. | |
| 5,884,199 A | 3/1999 | Maki | |
| 5,889,493 A | 3/1999 | Endo | |
| 5,917,454 A | 6/1999 | Hill et al. | |
| 5,923,287 A | 7/1999 | Lennen | |
| 5,929,807 A * | 7/1999 | Viney | G01C 15/00 342/357.32 |
| 5,986,615 A | 11/1999 | Westfall et al. | |
| 6,011,524 A | 1/2000 | Jervis | |
| 6,014,114 A | 1/2000 | Westfall et al. | |
| 6,016,128 A | 1/2000 | Imamura et al. | |
| 6,023,245 A | 2/2000 | Gomez et al. | |
| 6,031,499 A | 2/2000 | Dichter | |
| 6,049,309 A | 4/2000 | Timoshin | |
| 6,078,283 A | 6/2000 | Bednar | |
| 6,078,294 A | 6/2000 | Mitarai | |
| 6,088,653 A | 7/2000 | Sheikh et al. | |
| 6,154,170 A | 11/2000 | Dentinger et al. | |
| 6,157,344 A | 12/2000 | Bateman et al. | |
| 6,175,327 B1 | 1/2001 | Lin et al. | |
| 6,181,286 B1 | 1/2001 | Roscoe et al. | |
| 6,218,984 B1 | 4/2001 | Longaker et al. | |
| 6,229,488 B1 | 5/2001 | Lin et al. | |
| 6,259,399 B1 | 7/2001 | Krasner | |
| 6,292,147 B1 | 9/2001 | Ham | |
| 6,298,243 B1 | 10/2001 | Basile | |
| 6,307,509 B1 | 10/2001 | Krantz | |
| 6,320,548 B1 | 11/2001 | Harrell | |
| 6,407,709 B1 | 6/2002 | Hanshew | |
| 6,466,172 B1 | 10/2002 | Ryken et al. | |
| 6,522,291 B1 | 2/2003 | Noguchi et al. | |
| 6,542,119 B2 | 4/2003 | Howell | |
| 6,545,647 B1 | 4/2003 | Sievenpiper et al. | |
| 6,549,168 B1 | 4/2003 | Ryken et al. | |
| 6,618,016 B1 | 9/2003 | Hannan et al. | |
| 6,618,017 B1 | 9/2003 | Ryken et al. | |
| 6,618,019 B1 | 9/2003 | Kenoun | |
| 6,778,143 B2 | 8/2004 | Morita | |
| 6,779,752 B1 | 8/2004 | Ratkovic | |
| 6,812,902 B2 | 11/2004 | Rossman et al. | |
| 6,816,711 B2 | 11/2004 | Standke et al. | |
| 6,819,291 B1 | 11/2004 | Lackey et al. | |
| 6,839,033 B2 | 1/2005 | Shimabara et al. | |
| 6,842,145 B1 | 1/2005 | Ryken, Jr. et al. | |
| 6,853,338 B2 | 2/2005 | McConnell | |
| 6,859,181 B2 | 2/2005 | Colburn et al. | |
| 6,864,848 B2 | 3/2005 | Sievenpiper | |
| 6,870,507 B2 | 3/2005 | Anguera Pros et al. | |
| 6,879,288 B2 | 4/2005 | Byrne et al. | |
| 6,919,844 B1 | 7/2005 | Ryken, Jr. et al. | |
| 6,950,075 B1 | 9/2005 | Rivera | |
| 6,975,272 B2 | 12/2005 | Yuanzhu | |
| 7,009,557 B2 | 3/2006 | Kirchofer et al. | |
| 7,015,868 B2 | 3/2006 | Puente Baliarde et al. | |
| 7,068,233 B2 | 6/2006 | Thornberg et al. | |
| 7,091,917 B2 | 8/2006 | Jan et al. | |
| 7,119,757 B1 | 10/2006 | Lopez | |
| 7,138,949 B1 | 11/2006 | Ryken, Jr. et al. | |
| 7,199,765 B2 | 4/2007 | Chou et al. | |
| 7,202,818 B2 | 4/2007 | Anguera Pros et al. | |
| 7,202,822 B2 | 4/2007 | Baliarda et al. | |
| 7,253,770 B2 | 8/2007 | Yegin et al. | |
| 7,283,100 B2 | 10/2007 | Thompson et al. | |
| 7,286,084 B2 | 10/2007 | Lawrence | |
| 7,315,278 B1 | 1/2008 | Bauregger et al. | |
| 7,324,055 B2 | 1/2008 | Wan | |
| 7,336,241 B2 | 2/2008 | Bailey et al. | |
| 7,348,922 B2 | 3/2008 | Chang et al. | |
| 7,417,597 B1 | 8/2008 | Lopez | |
| 7,439,923 B2 | 10/2008 | Quintero Illera et al. | |
| 7,443,154 B1 * | 10/2008 | Merewether | G01V 3/104 324/326 |
| 7,450,082 B1 | 11/2008 | Lopez | |
| 7,468,695 B1 | 12/2008 | Williams | |
| 7,498,969 B1 | 3/2009 | Paulsen et al. | |
| 7,541,974 B2 | 6/2009 | Scherzinger | |
| 7,583,236 B1 | 9/2009 | Lopez | |
| 7,598,917 B2 | 10/2009 | Chen | |
| 7,642,957 B2 | 1/2010 | Lennen et al. | |
| 7,652,633 B2 | 1/2010 | Mai et al. | |
| 7,710,334 B2 | 5/2010 | Noro et al. | |
| 7,714,785 B2 | 5/2010 | Hsu et al. | |
| 7,843,386 B2 | 11/2010 | Benavides | |
| 7,928,847 B2 | 4/2011 | Murdoch et al. | |
| 7,932,867 B2 | 4/2011 | Tuttle | |
| 7,932,870 B2 | 4/2011 | Baliarda et al. | |
| 7,948,769 B2 | 5/2011 | Jakab et al. | |
| 8,026,853 B2 | 9/2011 | Puente Baliarda et al. | |
| 8,049,667 B2 | 11/2011 | Lackey | |
| 2002/0044085 A1 | 4/2002 | Howell et al. | |
| 2003/0011514 A1 | 1/2003 | Kirchofer et al. | |
| 2004/0070535 A1 * | 4/2004 | Olsson | G01S 7/03 342/459 |
| 2004/0227681 A1 | 11/2004 | Deng | |
| 2005/0024269 A1 | 2/2005 | Kotzin et al. | |
| 2005/0057397 A1 | 3/2005 | Ryken, Jr. et al. | |
| 2005/0088340 A1 | 4/2005 | Deng et al. | |
| 2007/0293150 A1 * | 12/2007 | Ezal | H01Q 1/243 455/25 |
| 2009/0204372 A1 * | 8/2009 | Johnston | G01S 19/22 702/191 |
| 2010/0060543 A1 * | 3/2010 | Fonseca | H01Q 9/44 343/848 |
| 2010/0254014 A1 | 10/2010 | Trinh et al. | |
| 2011/0063171 A1 | 3/2011 | Lopez | |
| 2011/0109522 A1 | 5/2011 | Merrick et al. | |

OTHER PUBLICATIONS

Brown, Alison K. et al., "GPS Multipath Mitigation Using a Three Dimensional Phased Array," Proceedings of ION GNSS 2005, Sep. 2005, pp. 1-8, NAVSYS Corporation, Long Beach, California.
Groves, Paul D. et al., "Novel Multipath Mitigation Methods Using a Dual-Polarization Antenna," 23rd International Technical Meeting

(56) References Cited

OTHER PUBLICATIONS of the Satellite Division of The Institute of Navigation, Portland, OR, Sep. 21-24, 2010, pp. 140-151.
Izadpanah, Ashkan, "Parameterization of GPS L1 Multipath Using a Dual Polarized RHCP/LHCP Antenna," Master's Thesis, Jan. 2009, pp. Cover-148, Department of Geomatics Engineering of Schulich School Engineering, University of Calgary.
Manandhar, Dinesh, et al, "GPS Signal Analysis Using LHCP/RHCP Antenna and Software GPS Receiver," Academic Paper, Nordnav Technologies in Sweden and Centre for Spatial Information Science at University of Tokyo, Japan.
Yung, Chan et al, "GPS Multipath Estimation and Mitigation Via Polarization Sensing Diversity: Parallel Iterative Cross Cancellation," ION GNSS 18th International Technical Meeting of the Satellite Division, Sep. 2005, pp. 2707-2719, Long Beach, California.
Zaheri, Mohammadreza, "Enhanced GNSS Signal Detection Performance Utilizing Polarization Diversity," Master's Thesis, Dec. 2010, pp. Cover-142, Department of Geomatics Engineering of Schulich School of Engineering, University of Calgary.

* cited by examiner

DUAL ANTENNA SYSTEMS WITH VARIABLE POLARIZATION

CROSS-REFERENCE TO RELATED APPLICATIONS

This application claims priority under 35 U.S.C. § 119(e) to U.S. Provisional Patent Application Ser. No. 61/618,746, filed Mar. 31, 2012, entitled DUAL ANTENNA SYSTEMS WITH VARIABLE POLARIZATION, and to U.S. Provisional Patent Application Ser. No. 61/786,385, filed Mar. 15, 2013, entitled DUAL ANTENNA SYSTEMS WITH VARIABLE POLARIZATION. The content of each of these applications is hereby incorporated by reference herein in its entirety for all purposes.

FIELD

This disclosure relates generally to apparatus, systems, and methods for receiving and processing signals from satellites and other transmitters. More specifically, but not exclusively, this disclosure relates to the design of antennas used in such reception and processing and of auxiliary beacons which may be used in conjunction with them, as well as to designs and methods of use of sonde beacons used in conjunction with antennas in the practice of locating buried utilities, and locators used therewith.

BACKGROUND

Traditional antennas used in receiving transmitted signals such as, for example, GLONASS and/or GPS signals, are subject to various error factors which compromise the accuracy and reliability of their resultant position data. One such error factor is inadequate visibility of satellites in some locations, such as in urban canyons where signals from satellites may be obscured by buildings and other obstacles. A second such factor is the problem of reflected and refracted signals resulting in what is known as multipath, the condition of an antenna receiving both direct and reflected signals from one or more satellites.

GPS signals, for example, are circularly polarized in a right-hand path (Right Hand Circularly Polarized RHCP). If the signal path to the antenna includes reflection, such as from the side of a building, for example, this polarization may be inverted to left-hand polarization (Left Hand Circularly Polarized or LHCP) in the reflected portion of the signal. Reflection of a signal may also affect the phase and amplitude of the reflected signal. The reflected component of the combined signal has a longer path to the antenna than the direct signal, and a longer signal travel time. The reflection of the multipath component will weaken the reflected signal depending on the additional travel and the electromagnetic properties of the reflecting surfaces. The signal may also be diffracted by building edges, for example.

When a combination of direct and reflected signals is received by a GPS antenna the combination may be constructive, causing a timing error, or destructive, also causing a timing error. The multipath-induced timing error is proportional to the strength and timing of the multipath signal relative to the direct signal. Despite various design solutions in the construction of antennas to attenuate the multipath component of combined signals, the ability to reduce multipath components to harmless levels has not been achieved. A second aspect of the problem is that multipath parameter estimation is made more difficult by the presence of noise, and this factor may be exacerbated when the multipath signal is partially attenuated.

Accordingly, there is a need in the art to address these and other problems in reception of satellite signals as well as signals from other transmitters.

SUMMARY

This disclosure relates generally to devices for receiving and processing signals from satellites and other transmitters. More specifically, but not exclusively, this disclosure relates to antennas used in reception and processing, and the use of such antennas for the receipt of signals such as GLONASS and GPS signals.

For example, in one aspect, the disclosure relates to an antenna system for receiving transmitted signals in which the antenna system comprises at least a first tuned antenna which may be disposed in a known relationship spatially with a second antenna and may be connected to the second antenna electrically.

In another aspect, the disclosure relates to an antenna system which co-locates two antennas in which the angle and method of connection of the two antenna elements enables the antenna to reliably discriminate between left-hand and right-hand polarized circular signals.

In another aspect, the disclosure relates to a method for use of a composite antenna array to enhance the accuracy of GPS locations by correlating direct and reflected signals at concentrically located interleaved antenna structures.

In another aspect, the disclosure relates to a method and system for physically tuning an antenna array to optimize reception, processing and discrimination of circularly polarized signals.

In another aspect the disclosure relates to a method and system for electrically tuning an antenna array to optimize reception, processing and discrimination of circularly polarized signals.

In another aspect, the disclosure relates to a physical design of collocated antenna structures.

In another aspect of the present disclosure, a sonde beacon may be used in relation to a locating receiver and to a GPS antenna, either co-located relative to the GPS antenna or as a stationery beacon positioned in a known location to assist in mapping locations during a locate operation, for example.

In another aspect of the present disclosure, a safety flasher ring may be incorporated into a locating receiver, an antenna support structure, or some other man-portable device.

In another aspect, the disclosure relates to means for implementing the above-described methods and/or system or device functions, in whole or in part.

In another aspect, the disclosure relates to methods of making and/or using antennas such as described above in receiver devices and systems.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Figure 1:
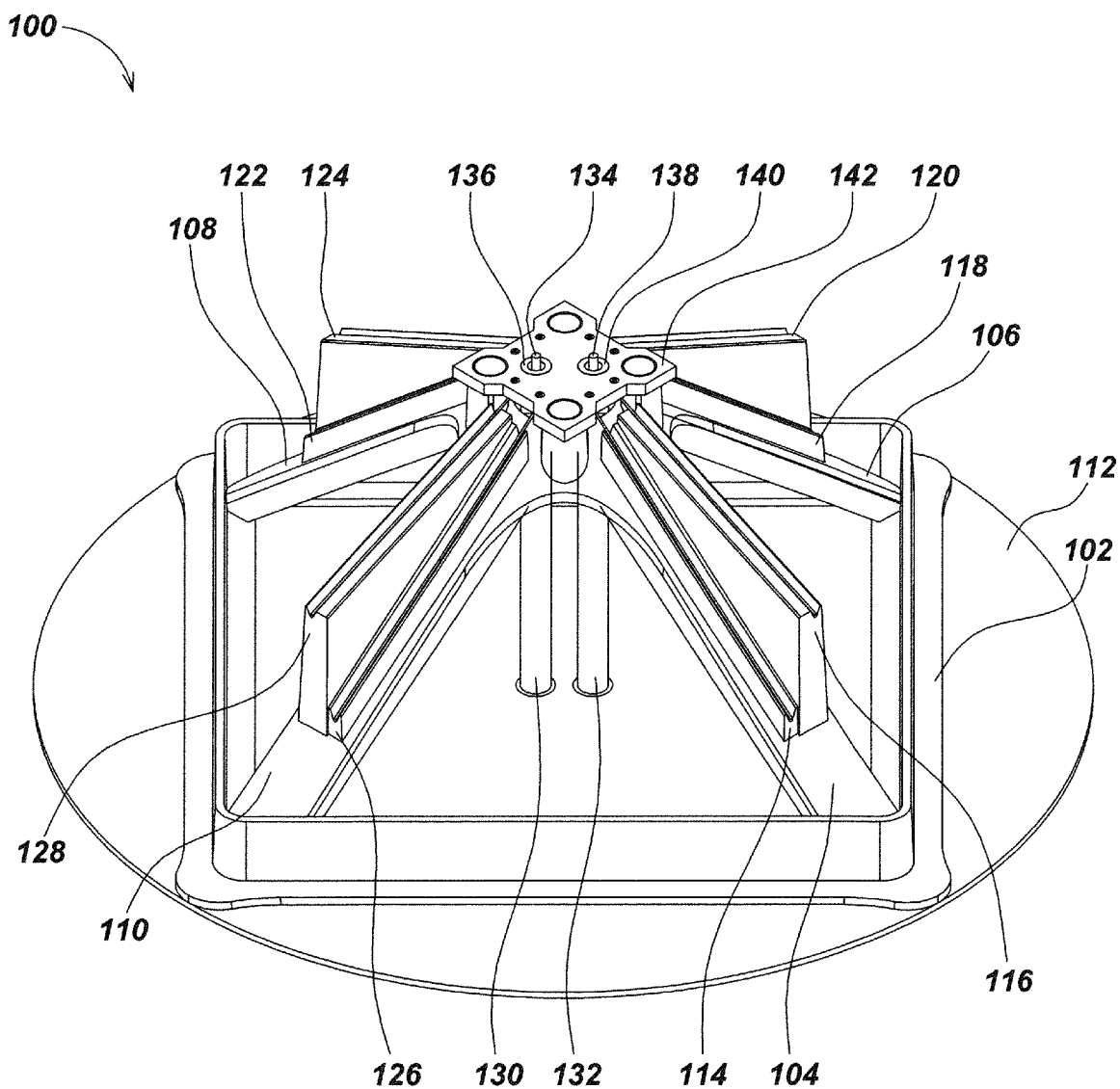
FIG. 1 is a perspective view of an embodiment of an antenna assembly.

The present disclosure relates generally to apparatus, systems, and methods for improved reception and processing of RF signals from satellites or other transmitters and to improving positional information obtained in locating operations. More specifically, but not exclusively, the disclosure relates to GPS antenna systems and methods for enhancing the reception and accuracy of positional information provided by RF signals from satellites.

In one aspect, the disclosure relates to a method of discriminating multipath signals and direct signals from a transmission source such as a satellite. This method may include a combination of at least two antennas arranged orthogonally on the horizontal plane and arranged with their conductive antenna elements at different heights and vertical angles so calculated as to optimize the reception of left-hand circular polarized (LHCP) signals and right-hand circular polarized (RHCP) signals on separate antennas. The antenna may, for example, include two or more conductive antenna elements each forming a planar angle of ninety degrees in which each half of the formed angle of a conductive antenna element is disposed on an inclined ramp such that the course of the second half runs lower than the course of the first half, the two conductive antenna elements thus comprising four segments orthogonal to each other (that is, disposed at 90 degrees on the horizontal plane relative to the segment on either side). A second antenna of similar construction may be so disposed that its segments are parallel to and a fixed optimized distance apart from the first antenna, the lower segments of the second antenna disposed next to the higher segments of the first antenna, and the higher segments of the second antenna disposed next to the lower segments of the first antenna. The two antennas may be supported at the feed end by a printed circuit board connected to a ground plane by rigid segments of coaxial conductor such that the upper central conductors of the coax are connected to conductive antenna elements 90 degrees apart, and the upper outer conductors of the coax connected to separate conductive antenna elements of the same antennas also 90 degrees apart. At the lower ends, the rigid coaxial conductors may be connected by a sleeve or one or more outer conductors to a common ground plane, and by the central conductors to two signal feeds terminating in 50-ohm SMA connectors, for example. In such an array, the rigid coaxial standoffs of a particular optimum length may balance the conductors and match impedances in the antenna circuits.

In another aspect, the present disclosure relates to an antenna support form configured to support optimum multipath discrimination by a dual antenna. Such a support form may, for example, include one or more vanes disposed at 90 degrees from another, each vane of which has formed into its top an upper groove, and formed into a shoulder slightly lower than its top a lower groove, said grooves serving as support paths for antenna conductive antenna elements. The lower grooves of the vanes may be formed on alternate flanks of the vanes, for example, such that the vanes at 0 and 180 degrees each has a lower groove on its right face, while the vanes at 90 degrees and 270 degrees, for example, each has a lower groove on its left face. The vanes may be anchored at their base in a square form, and each corner may include a molded foot suitable for anchoring the form in prepared holes in a ground plane substrate, for example.

In another aspect the present disclosure relates to a method of tuning an antenna to optimize the reception of and discrimination of RHCP and LHCP signals such as those from a satellite. The method may include, for example, the use of interleaved and concentrically disposed multiple antenna elements designed to receive both RHCP and LHCP signals. The method may further include, for example, the addition of additional elements for the purpose of establishing a variable minimum current location in an adjustable tuning ring or similar element. For example, the antenna form may have holes in each of its four vanes which may support a conducting circular element, such element being interrupted in its conductive path by a high-resistance joint formed of a plastic bead, a high-value in-line resistor, or other similar device. In such a configuration the circular conducting element may be physically rotatable through at least 180 degrees by rotating it manually within the supporting holes in the formed vanes for fine tuning the location within its circular path of the current minimum established by the resistive connector, and thus fine-tuning the polarization of the antenna.

In another aspect, the disclosure relates to a method of tuning an antenna to compensate for detected multipath distortion in received signals and correcting for them in the calculation of accurate positions. For example, the conductive antenna element lengths may be modified in one antenna to tune the antenna for operation in an environment, for example, where signal-reflection multipath signals are known to be the only multipath factor present. Modifying any of the physical parameters of one antenna in such a device may be done without affecting the tuning of the other if the antennas are designed to be independent of each other.

In another aspect the present disclosure relates to the deployment of a GPS antenna and processor system in conjunction with a sonde-beacon capable of omnidirectional transmission of multiple frequencies which may be used in conjunction with a locating receiver.

In another aspect of the present disclosure a time multiplexing method is used to energize a signaling or sonde beacon for enhanced signal detection, identification, discrimination and positional calculation by a receiver.

In another aspect the present disclosure relates to a safety alert flashing signal system that may be incorporated into a locating device or other man-portable device to enhance operator safety in operation.

In another aspect, the disclosure relates to one or more computer readable media including non-transitory instructions for causing a computer to perform the above-described methods, in whole or in part.

In another aspect, the disclosure relates to apparatus and systems for implementing the above-described methods, in whole or in part.

In another aspect, the disclosure relates to means for implementing the above-described methods, in whole or in part.

An exemplary embodiment of an antenna system includes a support form including a plurality of orthogonal vanes formed with inclined ramps of alternate heights and slopes (referred to as "high" ramps and "low" ramps for brevity), a corresponding plurality of conductive antenna elements comprising an array of receiving antennas, a ground plane, a circuit board, and a plurality of coaxial stand-off stubs or balun segments, and circuitry for connecting the antennas and taking signals from them. The antenna array may further include physical elements or printed circuitry for tuning the received beam. Such an antenna may be configured to tune dynamically in processing multiple signals or may be configured with a fixed tuning as required by intended use. It may be manually tuned to compensate for tolerances in building the antenna structure or other factors.

The dimensions of an exemplary embodiment may be modified to account for the velocity and frequency of signals of interest, permittivity of materials, and desired impedance, for example.

In one exemplary embodiment, the antenna array will be configured for receiving positional signals such as from a satellite system such as GPS or GLONASS, which use circularly polarized signals of known frequency. Modified designs of the antenna array may be configured to receive signals from terrestrial, cellular, marine or other systems to which the antenna array may provide an advantage.

The following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Referring to FIG. 1, an exemplary embodiment of an antenna assembly 100 may be disposed on a molded support form 102. A plurality of vane-like structures, such as, for example, a top vane 104, a left vane 106, a bottom vane 108, and a right vane 110 may be formed on molded support 102. The support form may be attached to a ground plane 112, which may be circular in form, or of some other form, and approximately ½ wavelength or greater in size relative to a received signal or range of signals. Each of vanes 104, 106, 108, and 110 may be configured with a high ramp molded on an upper surface and a low ramp molded along one of its sides. For example, one or more ramps, such as a top low ramp 114, a top high ramp 116, a left low ramp 118, a left high ramp 120, a bottom low ramp 122, a bottom high ramp 124, a right low ramp 126, and a right high ramp 128 may be formed. A pair of coaxial stubs, such as a lower coax standoff 130 and an upper coax standoff 132 may serve as stand-offs connected at their lower ends to the ground plane 112. The central conductors of such coaxial stand-offs are referred to herein as center conductors, while the outer conductors of such coaxial stand-offs are referred to as outer conductors.

The upper ends of the coaxial stand-offs may be connected to an upper PCB 142, such that the lower coax standoff 130 and the upper coax standoff 132 are connected to different circuit segments on the upper PCB 142 by the upper ends of the lower coax center conductor 134, the lower coax outer conductor 136, the upper coax center conductor 138, and the upper coax outer conductor 140.

Figure 2:
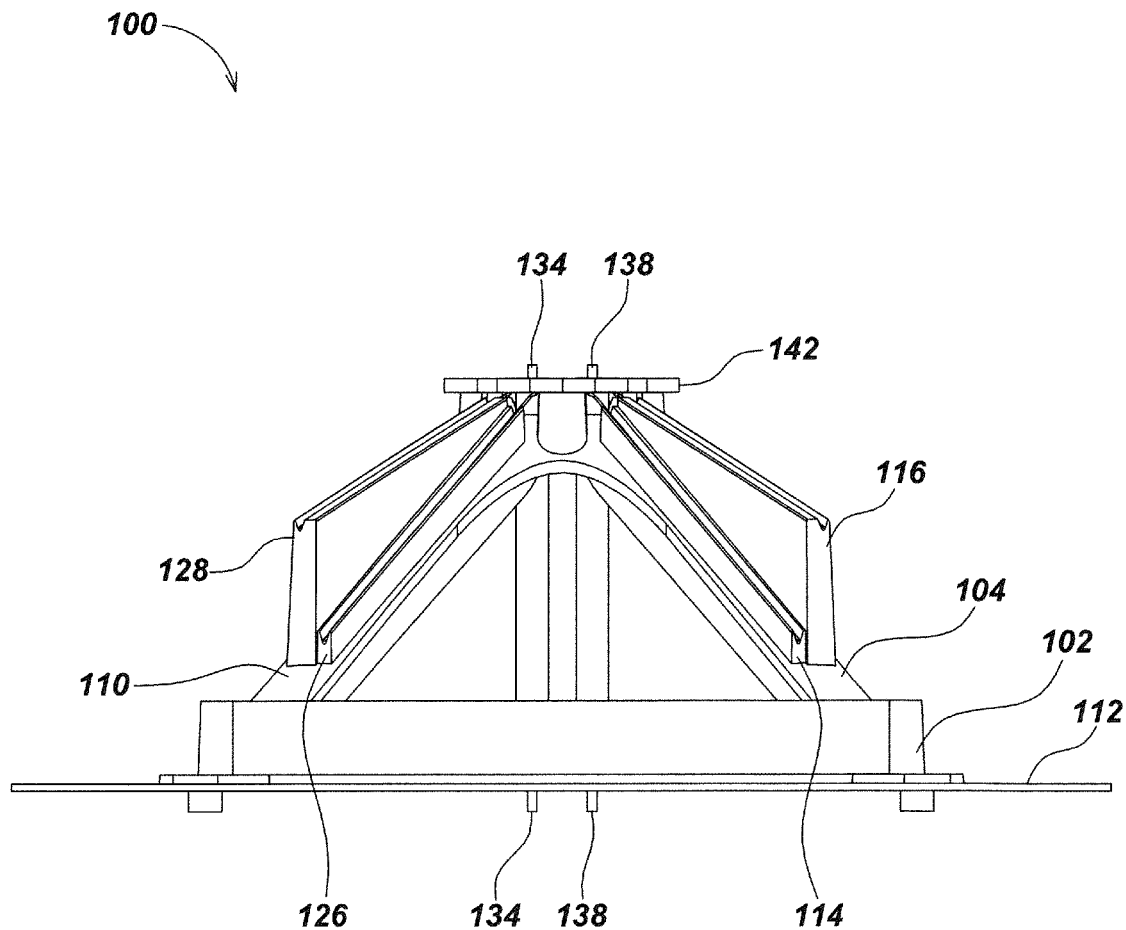
FIG. 2 is a side view of the antenna assembly embodiment of FIG. 1.

FIG. 2 is a side view of the antenna assembly 100 embodiment illustrating additional details. For example, antenna assembly 100 may include the right high ramp 128 and right low ramp 126 on right vane 110, and top high ramp 116 and top low ramp 114 on top vane 104. The slopes of the vanes may be separately calculated. The right low ramp 126, for example, may be formed at a different slope than its corresponding high ramp 128.

Figure 3:
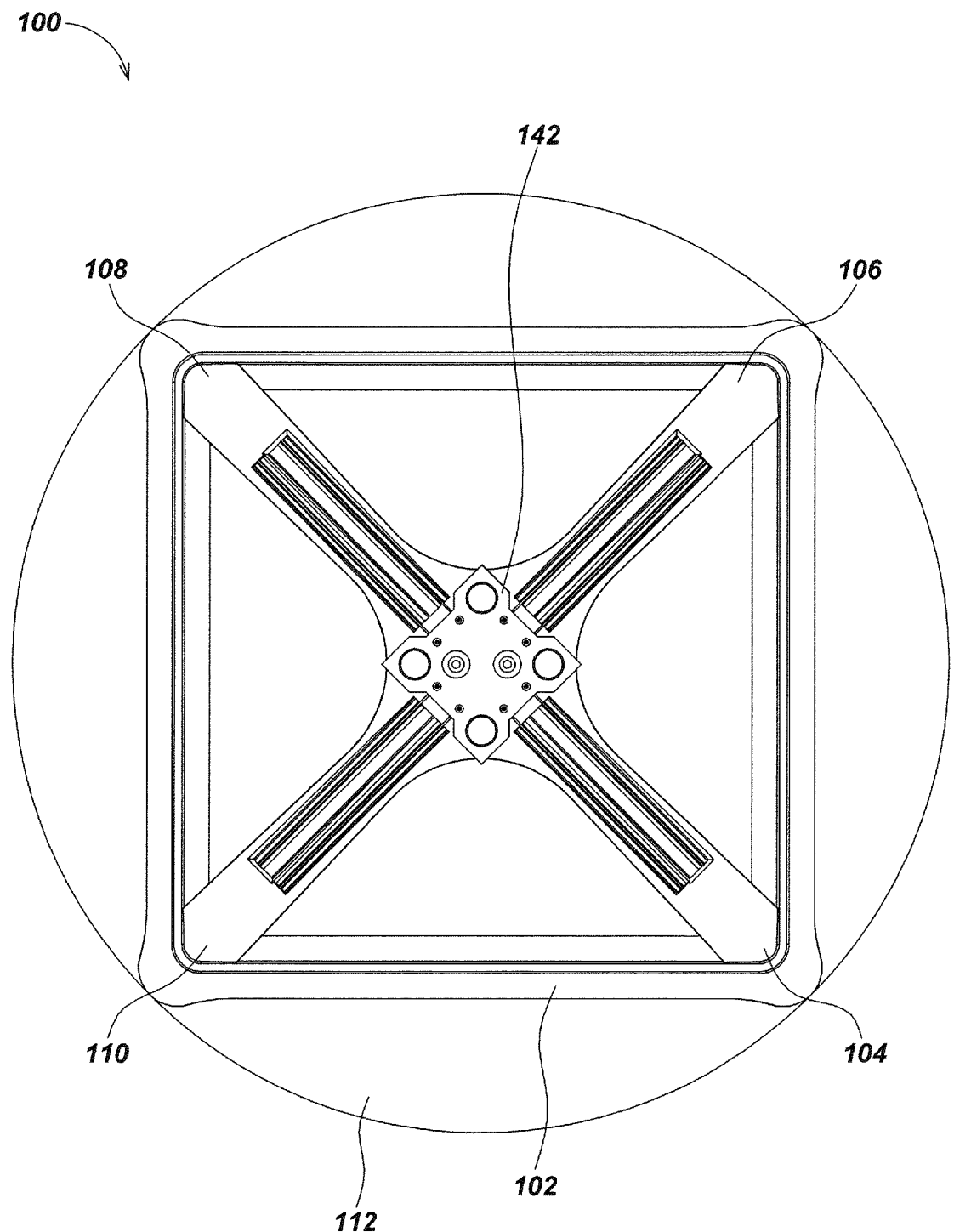
FIG. 3 is a top view of the antenna assembly embodiment of FIG. 1.

Referring to FIG. 3, a top perspective view of the antenna assembly embodiment 100 illustrates additional details. In an exemplary embodiment, the top vane 104, right vane 110, bottom vane 108, and left vane 106 may be formed so as to be orthogonal to each other. For each vane, the ramps may be formed to run aligned with the vane's centerline. One or more circuit elements, such as an upper printed circuit board 142 may be supported by feet molded into the support form 102. The upper ends of the lower coax standoff 130 (FIG. 1) and the upper coax standoff 132 (FIG. 1) may join to the PCB in such a way that the lower coax center conductor 134, the lower coax outer conductor 136, the upper coax center conductor 138 and the upper coax outer conductor 140 may be electrically separately connected circuits on the upper PCB 142.

In one aspect, the bottom ends of the lower coax outer conductor 136 and the upper coax outer conductor 140 may connect with a ground plane in common.

Figure 4:
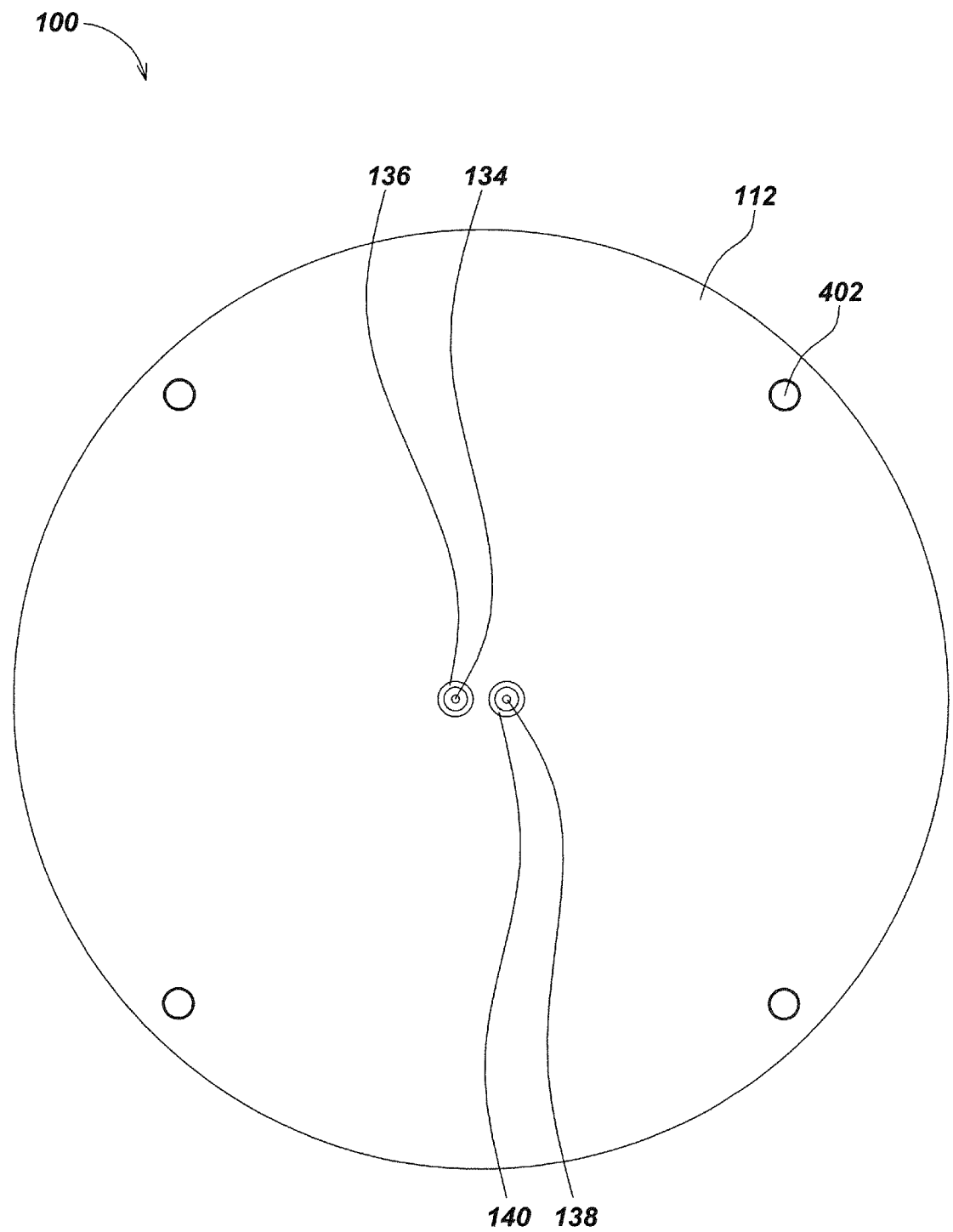
FIG. 4 is a bottom view of the antenna assembly embodiment of FIG. 1, illustrating a ground plane.

Referring to FIG. 4, a bottom view of the antenna assembly embodiment 100 is illustrated. The ground plane 112 may be fitted with holes at chosen locations into which the formed support form one or more feet, such as feet 402, may be attached. The bottom end of the upper coax sleeve connector 140 and of the lower coax sleeve connector 136 may be electrically joined to the ground plane 112, while bottom ends of the lower coax center connector 134 and the upper coax center connector 138 may be left open for connection to signal leads from the antenna to a signal processing unit (not shown).

Figure 5:
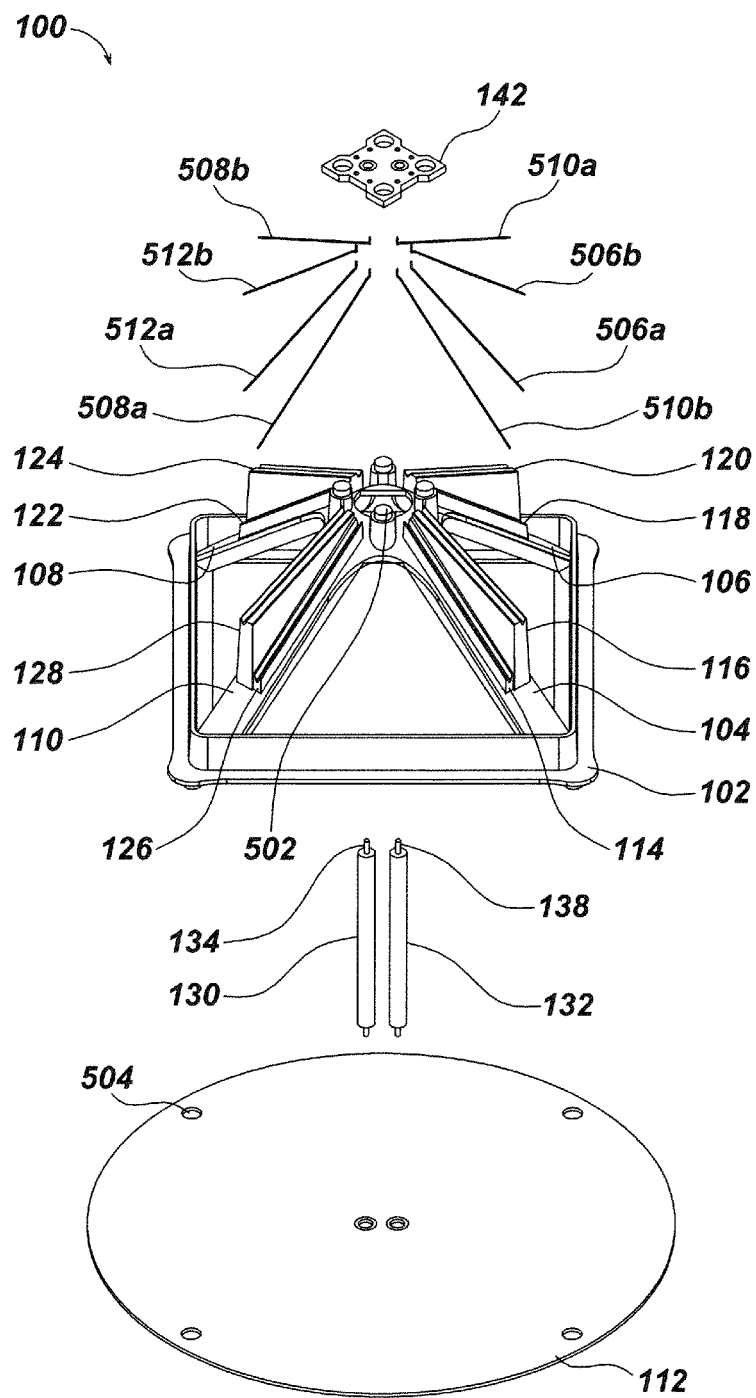
FIG. 5 is an exploded view of the antenna assembly embodiment of FIG. 1.
Figure 6:
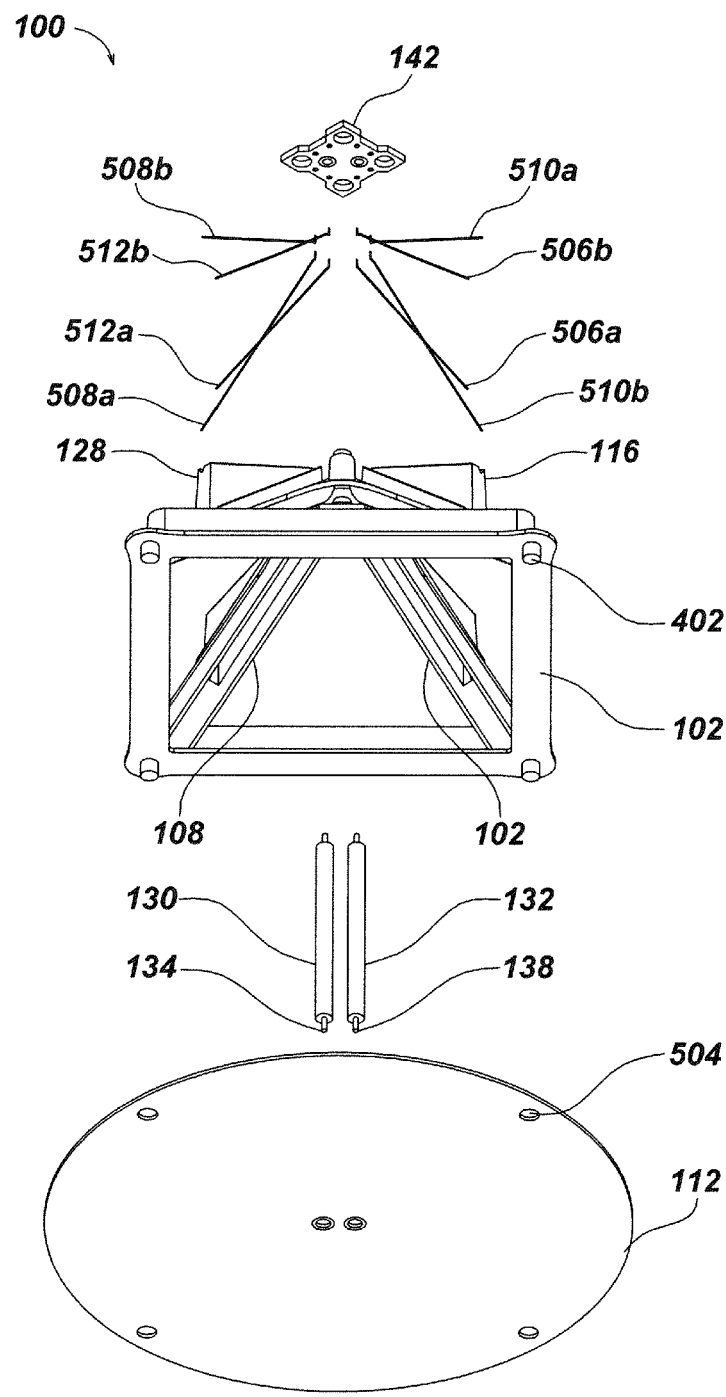
FIG. 6 is an exploded view of the GPS antenna assembly embodiment of FIG. 1, taken from the bottom side thereof.

Turning to FIGS. 5 and 6, exploded views of the antenna assembly embodiment 100 (FIG. 1) illustrate additional details. For example, the upper PCB 142 may attach to the support form 102 by one or more molded feet, such as feet 502 formed into the upper end of the support form 102. The ground plane 112 may similarly be attached to molded feet, such as feet 402 (FIG. 4) inserted into openings such as 504.

In one aspect, a pair of antennas may be formed by a plurality of wire segments which may be mated to a support form calibrated to optimize performance.

A first antenna upper segment 506a and 506b, which may be formed of copper wire, for example, may be routed along the top high ramp 116 on the top vane 104, connected electrically to the upper PCB 142, and routed along the left low ramp 118 formed along the left vane 106. A first antenna lower segment 508a and 508b may be routed orthogonally to the first antenna upper segment 502, routed along the right low ramp 126 formed into right vane 110, electrically connected to upper PCB 142, and routed along bottom high ramp 124 along the upper surface of bottom vane 108. Each segment of the first antenna may thus form a right angle, the two segments taken together forming four orthogonal arms along the four vanes. The first antenna may include segments 506a, 506b, 508a, and 508b.

A second antenna upper segment 510a and 510b may be routed along left high ramp 120 along the upper surface of left vane 106, electrically connected to the upper PCB 142, and routed along the top low ramp 114 formed into top vane 104. A second antenna lower segments 512a and 512b may be routed along the right high ramp 128 along the upper surface of right vane 110, electrically connected to the upper PCB 142, and routed along the bottom low ramp 122 formed into bottom vane 108. Each segment of the second antenna may form a right angle, the two segments of the second antenna forming four orthogonal arms along the four vanes. The second antenna may include segments 510a, 510b, 512a, and 512b.

In an exemplary embodiment, the segments of each antenna may be electrically connected to a coaxial stub for signal induced into the antenna as well as a signal takeoff for that antenna. For example, the first upper antenna segment 506a and 506b may be electrically connected to the upper coax center conductor 138. The first lower antenna segment 508a and 508b may be electrically connected to the upper coax outer conductor 140. The second upper antenna segment 510a and 510b may be electrically connected to the lower coax center conductor 134. The second lower antenna segment 512a and 512b may be electrically connected to the lower coax outer conductor 136.

Figure 7:
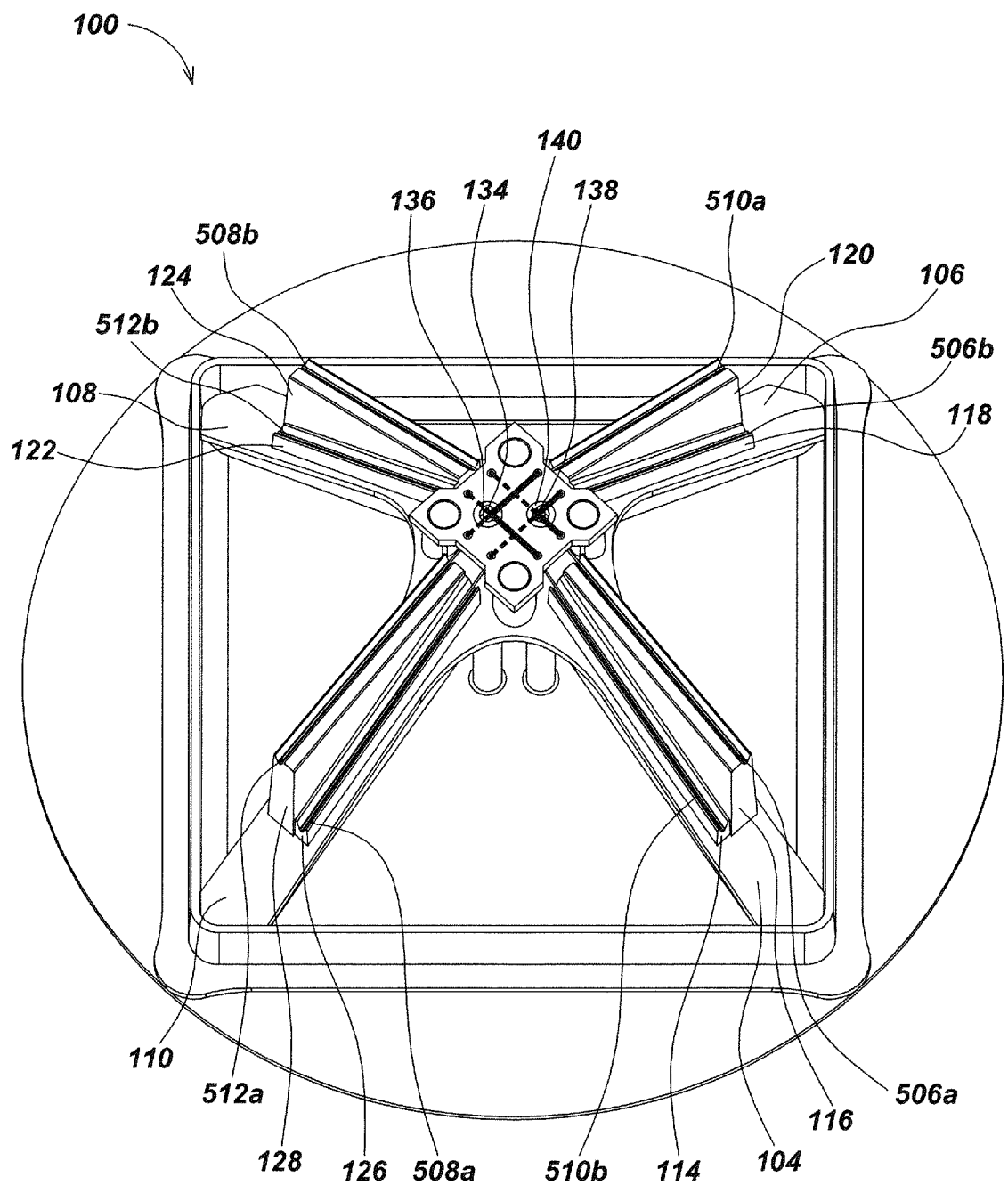
FIG. 7 is a top view of the GPS antenna assembly embodiment of FIG. 1, illustrating a plurality of antenna elements.

Turning to FIG. 7, a top view of the GPS antenna assembly embodiment 100 (FIG. 1) is illustrated. For example, two antennas orthogonally arranged and interleaved around the same center may be used to discriminate between LHCP and RHCP polarized antennas. A single incident wave may strike, for example, such that its positive high voltage will impinge at 0 degrees, which may be along the first upper antenna 506a on the axis of the top vane 104 while the same wave's peak negative voltage will impinge on the first lower antenna segment 508b along the axis of the bottom vane 108 at a relative 180 degrees. The magnetic component of the same wave will impinge on the first upper antenna 506b situated on the left low ramp 118, and on the first lower antenna 508a situated on the right low ramp 126. The result of these impingements may be a maximum signal strength for the first antenna with the two wave components 90 degrees apart and maximally correlated in time and location.

In one aspect, the voltage will be highest, and the current lowest, at the antenna ends, and the current highest at the center of the structure. Because of the alternating disposition of high ramps and low ramps being used by the first and second antennas, and the orthogonal disposition of antenna elements, the same wave may produce opposite peaks in the second antenna, 90 degrees removed from the phase registered by the first antenna segments.

An incident LHCP wave will have its maximums 90 degrees removed from an incident RHCP wave. If the vertical components of an incident signal are high for the first antenna for an LHCP wave, for example, they will be low for an RHCP wave. The first antenna, for further example, may maximize the signal from a RHCP wave and minimize the signal from a LHCP wave; conversely, the second antenna at the same moment will maximize the signal from an LHCP wave and minimize the signal from an RHCP wave, given the co-location in space and time of the two antenna responses. In this manner, the signals from the two antennas may be compared at that moment in time.

Different software-based approaches in computing a positional resultant may be adapted for differing comparisons in the two antenna signals. For example, a strong RHCP signal and weak LHCP signal may be taken as an indication of higher confidence in indicated position than a strong LHCP and weak RHCP combination (which would indicate the signal is primarily a reflected one). A strong RHCP and a strong LHCP may be interpreted as an indication of multipath condition requiring comparison with a different satellite. The ability to compare signals in this manner may also provide a basis for excluding certain satellites from a positional computation for a particular location when the comparison and correlation indicates its signal is unreliable in that location. Such comparison would not be as reliable using dual antennas in separated locations because the correlation would not be as certain.

The comparison and correlation of signals may be achieved by connecting the bottom end of the upper coax center conductor 138 (FIG. 1) to a single-feed first receiver, and connecting the bottom end of the lower coax center conductor 134 (FIG. 1) to a second receiver. The processed results of the two receivers may then be sent to a single user interface module for side-by-side comparison, for example, of LHCP and RHCP signals, or other correlation and analysis in software. In an alternative embodiment, the two feeds from the center conductors of the two coax stand offs may be routed through a switching device and thence to a single receiver and user interface in which the feeds are alternately displayed by switching from one to the other. In either case, the connection to the receiver is an unbalanced one, the received signal having been converted by the action of the balun effect of the two rigid coaxes from the inherently balanced antenna to the unbalanced receiver.

It will be appreciated by one skilled in the art that specific dimensions of the ramps used in these examples, including their relative heights and/or slopes and angles, may be important to achieve optimal performance of such an antenna. In the examples provided in FIGS. 1-7, the design may be calibrated for a resultant impedance of 50 ohms at the feed point of the antennas at the upper PCB 142. This impedance is a composite function of angle of incidence, conductive antenna element length and diameter, signal frequency, and other factors. Similarly, the length of the upper and lower coax standoffs may be calibrated to match the impedance, for example, of 50 ohms with the intention of feeding signal through SMA connectors (not shown) electrically connected to the bottom ends of the upper coax center conductor 138 and the lower coax center conductor 134. It will be further appreciated by one skilled in the art that the impedance may be transformed by the use of different coax characteristic impedance lines such as 50 ohms and 72 ohms, for instance.

In one aspect, the response of an antenna may be tuned in manufacture for an orientation optimized for an intended siting or deployment. This may be accomplished, for example, by the addition of higher-order elements to the antenna structure. The design of such elements may augment the control of an antenna beam.

Figure 8:
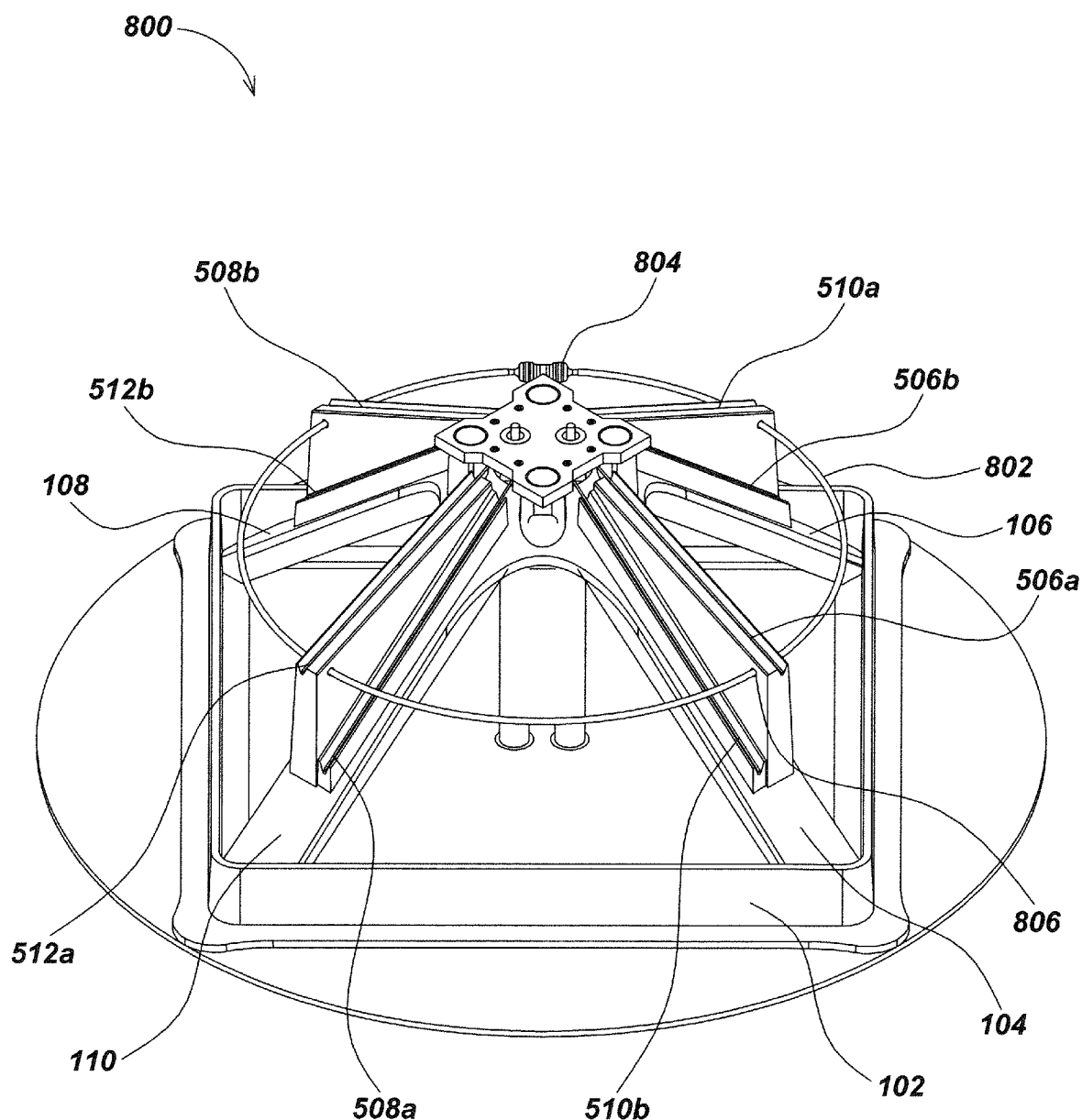
FIG. 8 is a perspective view of an embodiment of a tunable antenna assembly.

Turning to FIG. 8, an embodiment of a tunable antenna array 800 is illustrated. A circular conductive ring 802 of metal or comparable material may be formed with a small gap in which a high-value resistor 804 is located. The resistor may be used as a relatively non-conductive spacer. The conductive ring may be mounted through a series of holes such as 806 formed in the body of the several vanes such as 104, for example. The gap and the high-resistance object placed into it such as resistor 804 will cause a current minimum to occur on the first side of the gap, and consequently, a voltage maximum. If the angle of the gap relative to the antenna segments is changed, such as by rotating the ring 802 through the holes such as 806, the impact of the changed angle will be to modify the polarization of the antenna array. The antenna could be tuned for optimum performance for various build tolerances by rotating the ring 802 and its resistor 804 to the appropriate angle. The resistor 804 may be a structural element of high electrical resistivity such as a plastic connector, for example, or it may be a commercially-made resistor. The strategic placement of the current-minimum provides beam control for the antenna. Such placement may be determined during manufacture.

Figure 9:
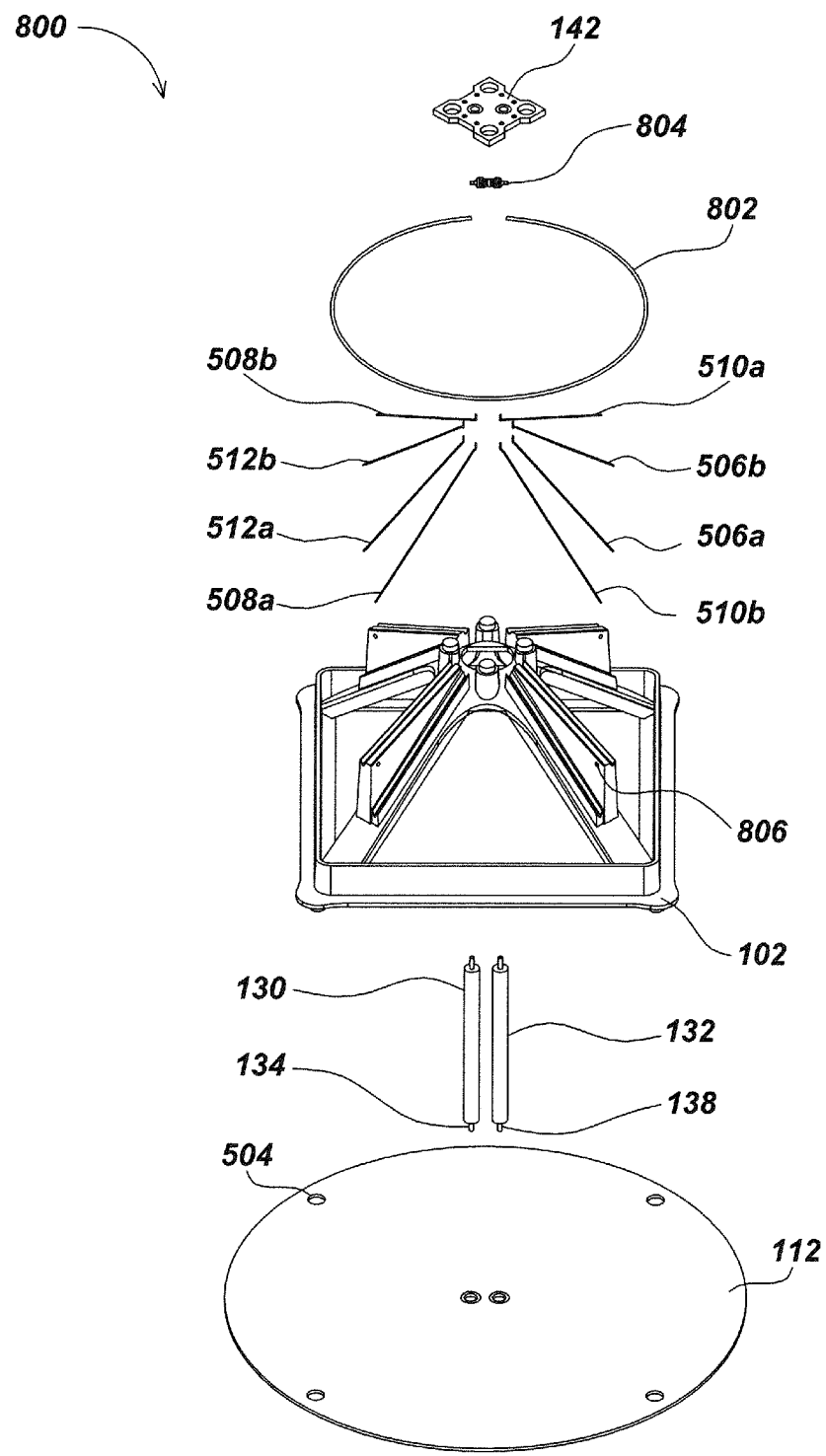
FIG. 9 is an exploded view of the tunable antenna assembly embodiment of FIG. 8.
Figure 10:
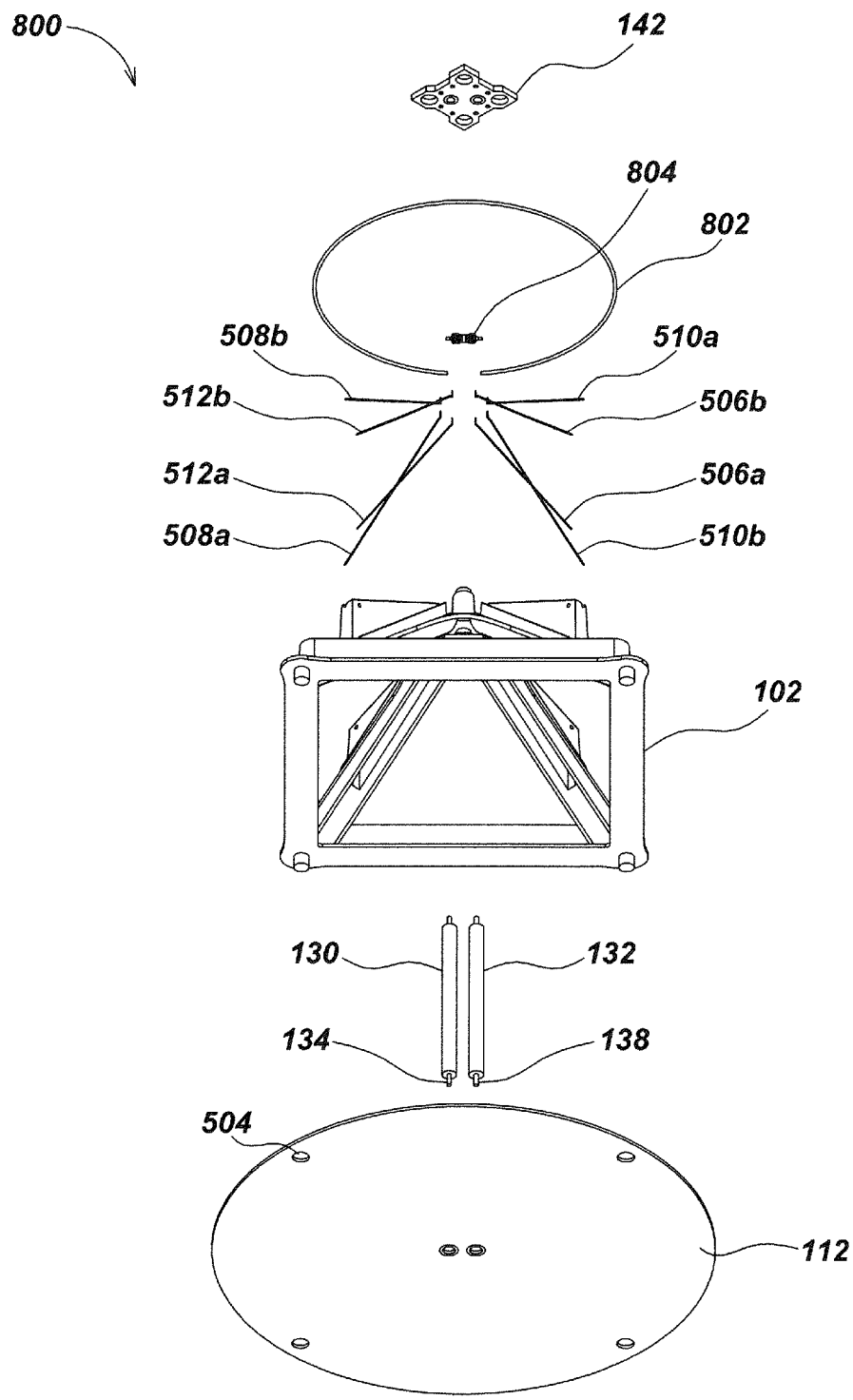
FIG. 10 is a bottom-up exploded view of the tunable antenna assembly embodiment of FIG. 8.

Turning to FIGS. 9 and 10, exploded views of an embodiment of a tunable antenna array 800 is illustrated. In an exemplary embodiment, a tuning ring 802 (of FIG. 8) may alternatively manually adjust during assembly or under automatic control. This may be effected by using

TABLE 1

Antenna Components and Connections

| Segment | Start Ramp | Start Vane | Connector | End Ramp | End Vane | Output to receiver |
|---|---|---|---|---|---|---|
| First Upper (FU) 506 | TH 116 | 104 | UP 138 | LL 118 | 106 | 1104 |
| First Lower (FL) 508 | RL 126 | 110 | US 140 | BH 124 | 108 | |
| Second Upper (SU) 510 | LH 120 | 106 | LP 134 | TL 114 | 104 | 1102 |
| Second Lower (SL) 512 | RH 128 | 110 | LS 136 | BL 122 | 108 | | a tuning capacitor as the spacer 804. The variable reactance may tune the position of the current minimum either mechanically for a physical variable capacitor or using electronic bias and a varactor for the capacitor 804. Modulating the current minimum of circular ring 802 may modulate the antenna beam pattern. Such dynamic control may be controlled by software based on feedback from the GPS signal processing module or modules. A plurality of such tuning elements may be used.

Figure 11:
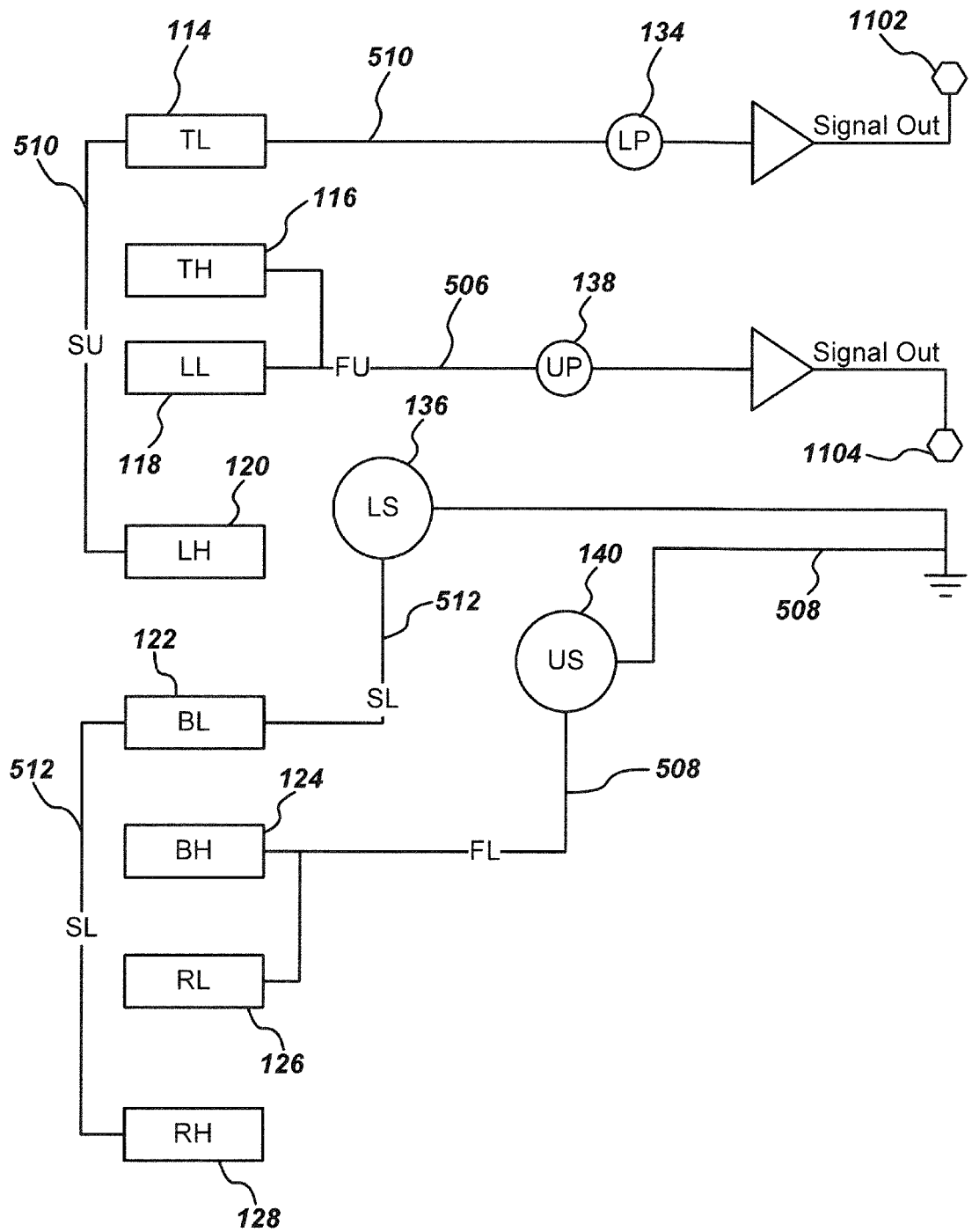
FIG. 11 is a diagram illustrating details of a GPS antenna assembly embodiment.

Referring to FIG. 11, a diagram illustrating details of a GPS antenna assembly embodiment illustrates the relationship of the wire segments, ramps and vanes in an exemplary embodiment. Table 1 above entitled "Antenna Components and Connections) is a key to the elements illustrated in FIG. 11.

In an exemplary embodiment where a switching unit is used, both antennas may use the same receiver unit alternately, or some alternative switching scheme may be employed. In FIG. 11, outputs to two receivers such as first antenna output to first receiver 1102 and second antenna output to second receiver 1104 may be outputs, for example, to GPS receivers.

In one aspect of the present disclosure an antenna array such as a GPS antenna may be deployed in a combination of devices which includes a transmitting beacon (located on the same central axis as the GPS antenna) which transmits a signal whose origin point may be detected by an appropriately equipped locator. The use of beacons transmitting a known frequency is known in the locating industry, where small transmitting sondes are used to identify the location of a camera, for example, in an underground pipe. Modern locators are capable of detecting the angle and distance of such a beacon by measurement of its transmitted field using omnidirectional antennas. In one aspect of the present disclosure a beacon is mounted in close proximity to and coaxially with a GPS antenna such that a locator may detect its location in order to provide precise measurement of the relative location of a detected underground conductor such as a pipe. In another aspect of the present disclosure the sonde beacon may transmit omnidirectionally and may transmit on a single frequency or on multiple frequencies.

Figure 12A:
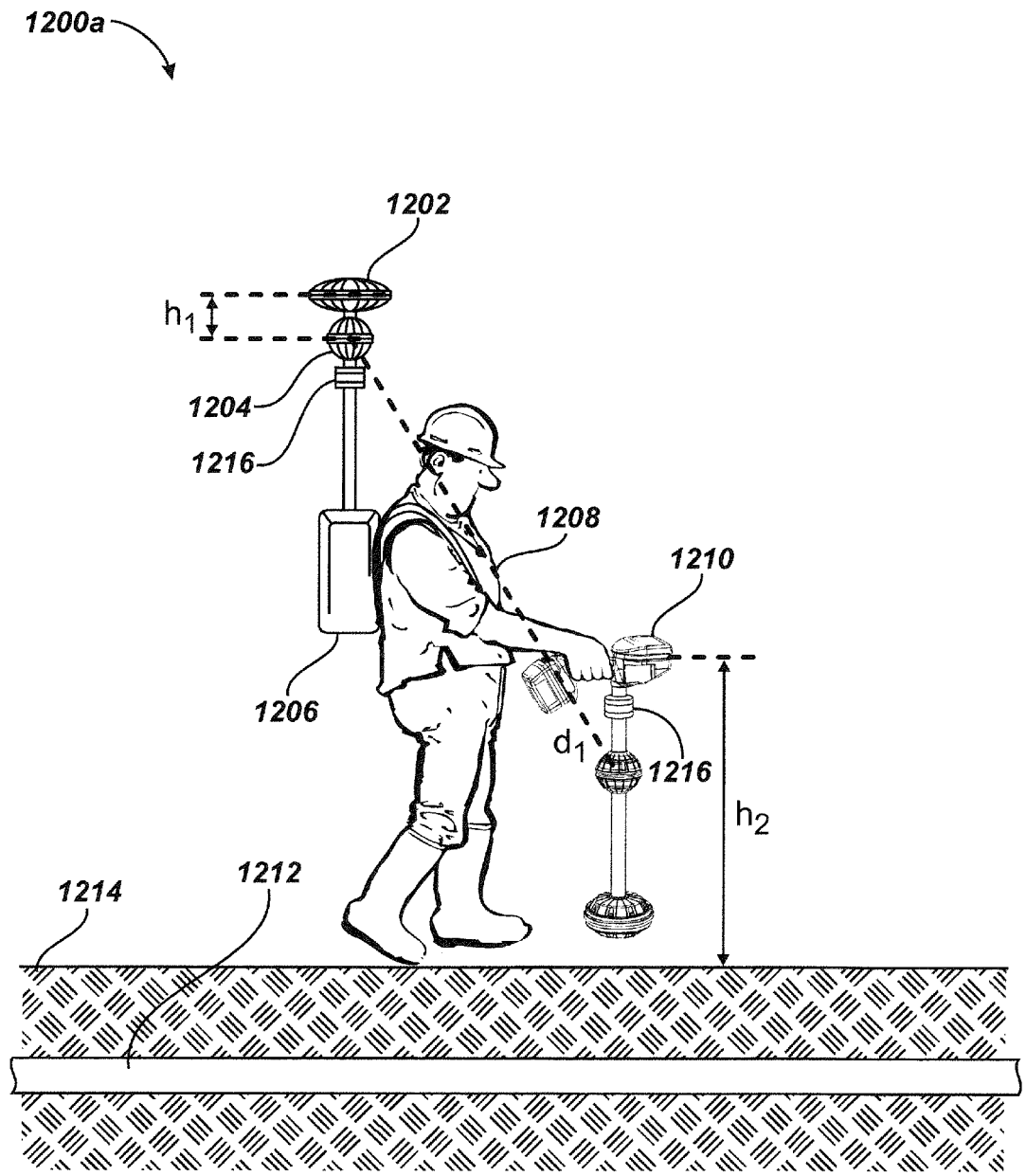
FIG. 12A illustrates details of a GPS antenna embodiment, as deployed in conjunction with a sonde beacon.

Referring to FIG. 12A, details of a GPS antenna embodiment, as deployed in conjunction with a sonde beacon, is illustrated. An exemplary deployment of a dual antenna embodiment entails the use of a combined antenna, receiver and sonde beacon system 1200a, which may include an enclosed dual antenna 1202 and an enclosed omnidirectional sonde beacon 1204, which may be attached to a backpack 1206 or similar carrying mechanism worn by an operator 1208 who carries a locator 1210 while tracing a conductor 1212 such as a pipe, conduit or cable buried in the ground 1214. Receiver processors may be incorporated into the enclosed antenna module 1202 and may communicate by Bluetooth link or other wireless means to the locator 1210. Battery power may be supplied from the backpack 1206. The distance h1 between the center of antenna 1202 and the center of the sonde beacon 1206 is fixed and known. The height of the locator above ground h2 may be detected by sensors associated with locator 1210. By detection of an omnidirectional beacon signal from sonde beacon 1204 the distance d1 from the antenna nodes of the locator 1210 may be computed by the locator 1210 on-board computing circuitry. These calculations may be combined with the locator's depth calculation to the buried conductor 1212 to provide a precise calculated location for the buried conductor 1212 as offset from the positional report from the dual antenna 1202.

A safety flasher ring 1216 designed to emit warning flashes from LEDs may be incorporated into the mast 1218 supporting the sonde 1204 and the antenna system 1204. A similar LED safety flasher ring 1216 may independently be incorporated around the mast of the locator 1210 for safer operation of the system in trafficked areas.

Figure 12B:
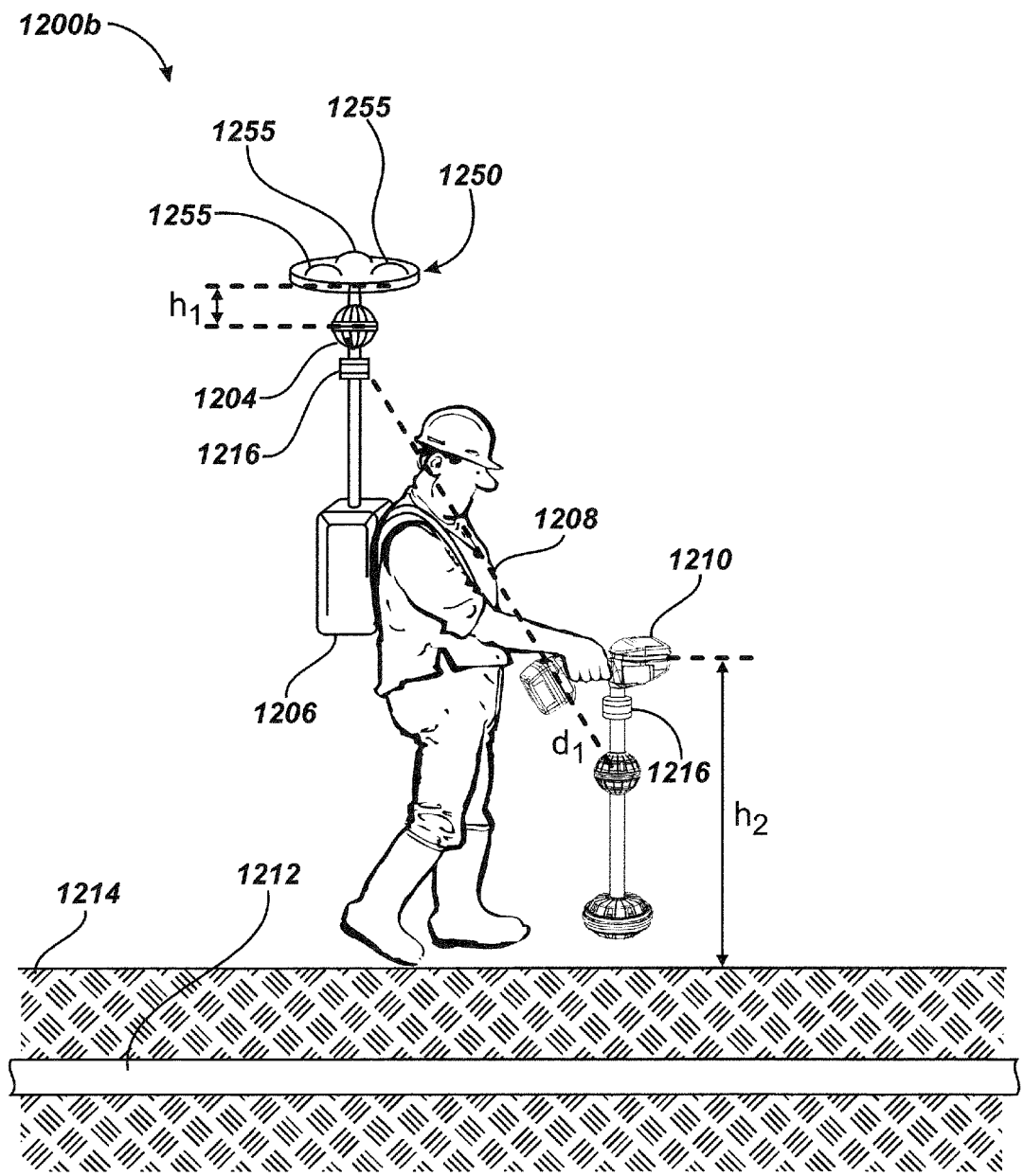
FIG. 12B illustrates details of a GPS antenna embodiment with three GPS antennas.
Figure 12C:
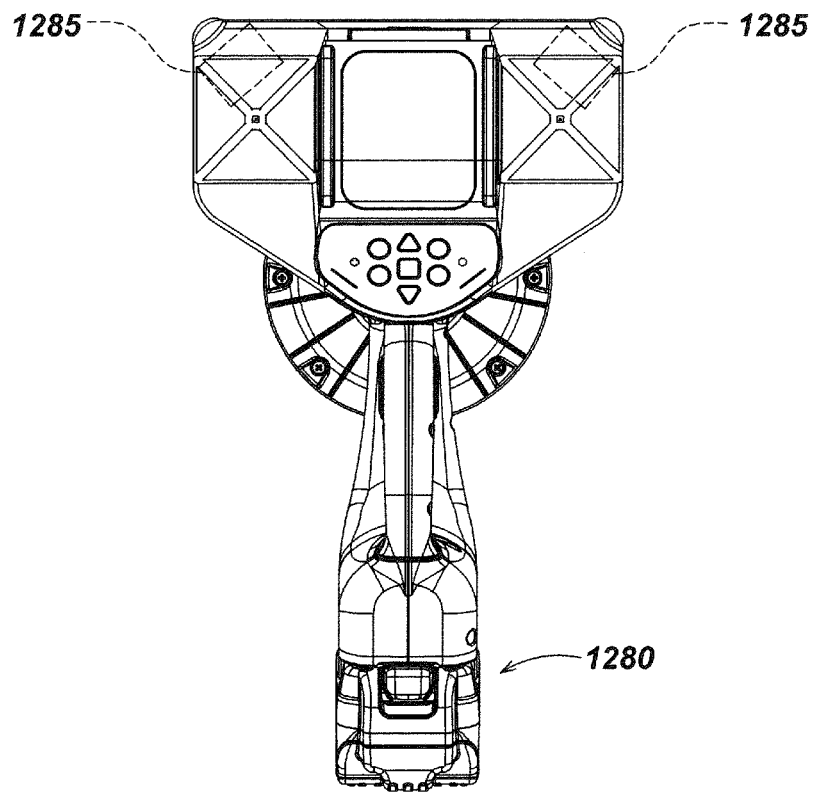
FIG. 12C illustrates details of a GPS antenna embodiment built into a locator device.

Turning to FIG. 12B, a sonde beacon system 1200b may be similar to the sonde beacon system 1200a of FIG. 12A except with the antenna 1202 replaced with an enclosed GPS antenna triad 1250 containing three GPS antennas 1255 in a nominally horizontal plane. Alternative embodiments, such as illustrated in FIG. 12C wherein multiple GPS antennas 1285 may be built into a locator device 1280. In yet further embodiments, any number of GPS antennas in keeping with the present disclosure may be used. In such embodiments containing multiple GPS antennas, orientation may be resolved through GPS compass-type techniques. In some embodiments containing multiple GPS antennas in keeping with the present disclosure, signal-to-noise ratio may be measured at each GPS antenna at a single point in time. A device utilizing multiple GPS antennas may be enabled to decide which to exclude based on the signal strength difference. In yet other embodiments, a scheme may be used whereby, for instance, a slightly weaker albeit more stable RHCP signal may be preferred over a stronger LHCP signal as it may be more likely to be direct path and may be less likely to be bounced.

Figure 13:
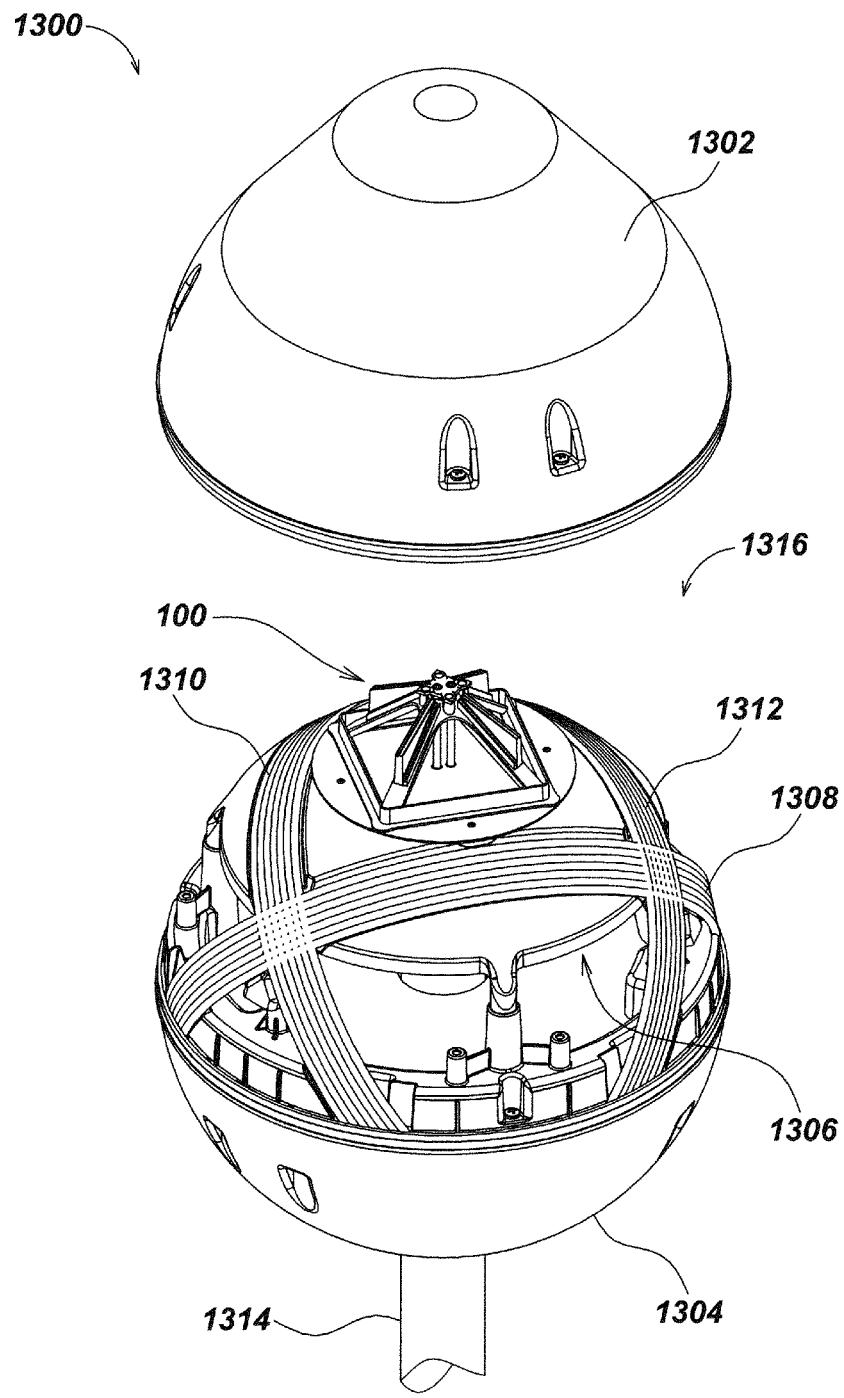
FIG. 13 illustrates details of an embodiment of a sonde beacon assembly configured with a GPS antenna.

Referring to FIG. 13, the construction of an exemplary sonde beacon 1300 (FIG. 12A) may include an upper shell half 1302 (shown moved aside for illustration) and a lower shell half 1304 containing a sonde beacon antenna assembly 1316.

A GPS antenna assembly embodiment 100 (FIGS. 1-7) may be configured into the sonde beacon structure 1300, for example, to act as a receiver for GPS positional signals. Alternatively, the antenna assembly 100 (FIGS. 1-7) may be mounted in a separate shell, or in some other suitable fashion.

The shell halves may contain an inner support structure assembly 1306 around which may be located a plurality of antenna primary coils such as a first primary coil 1308, a second primary coil 1310 and a third primary coil 1312, arranged orthogonally to each other. Each antenna primary coil may be electrically isolated from the other primary coils. Each primary coil may consist of a plurality of windings of Litz wire or other comparable conductive material. Litz wire may be used in these antenna structures to reduce skin-effect losses. In the present example seven windings of Litz wire are used for each primary coil. The sonde beacon 1300 may be supported on a light-weight mast 1314 for attachment to a backpack 1206 (FIG. 12A), for example, or other mounting system.

Figure 14:
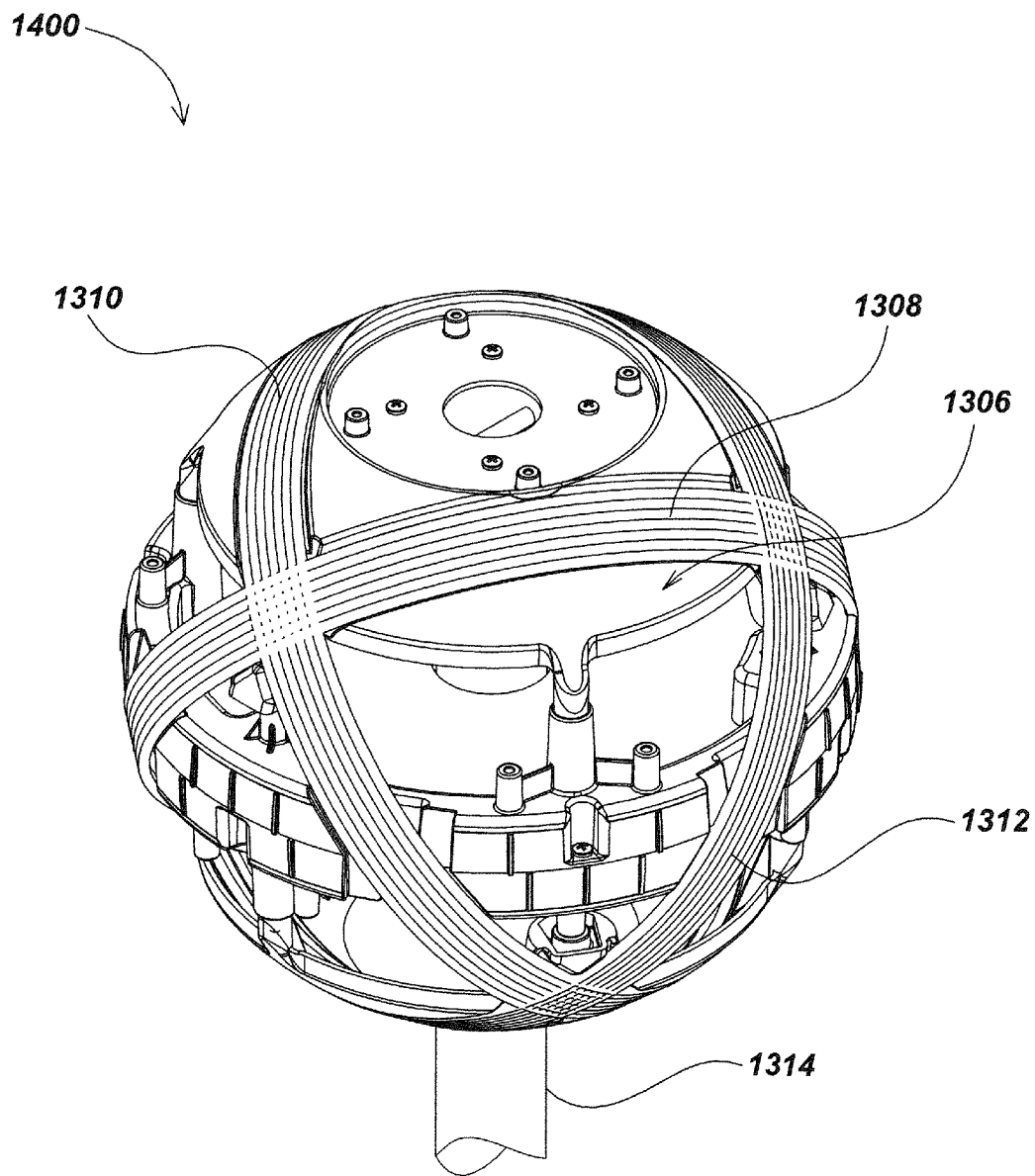
FIG. 14 illustrates details of a sonde beacon assembly.

Referring to FIG. 14, details of a sonde beacon assembly embodiment 1400 are illustrated. A sonde beacon assembly 1400 may omit the dual antenna assembly 100 (shown in FIG. 13). Upper shell half 1304 (FIG. 13) and lower shell half 1304 (FIG. 13) have been removed for purposes of illustration.

Figure 15:
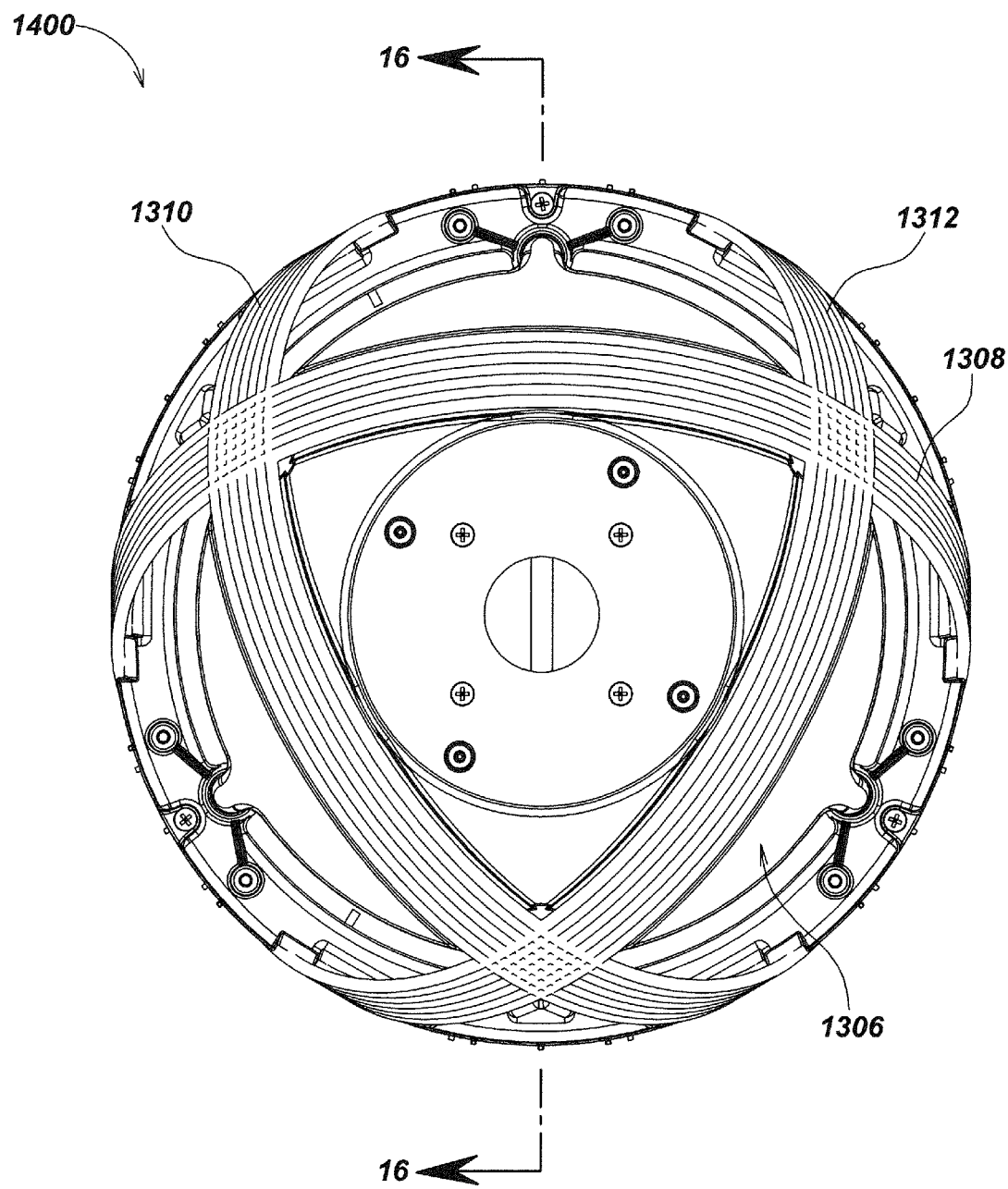
FIG. 15 is a top view illustrating the primary coils of the sonde beacon assembly of FIG. 14.

Referring to FIG. 15, the sonde beacon antenna assembly embodiment 1400 is viewed from above. The section line for a section view in FIG. 16 is indicated.

Figure 16:
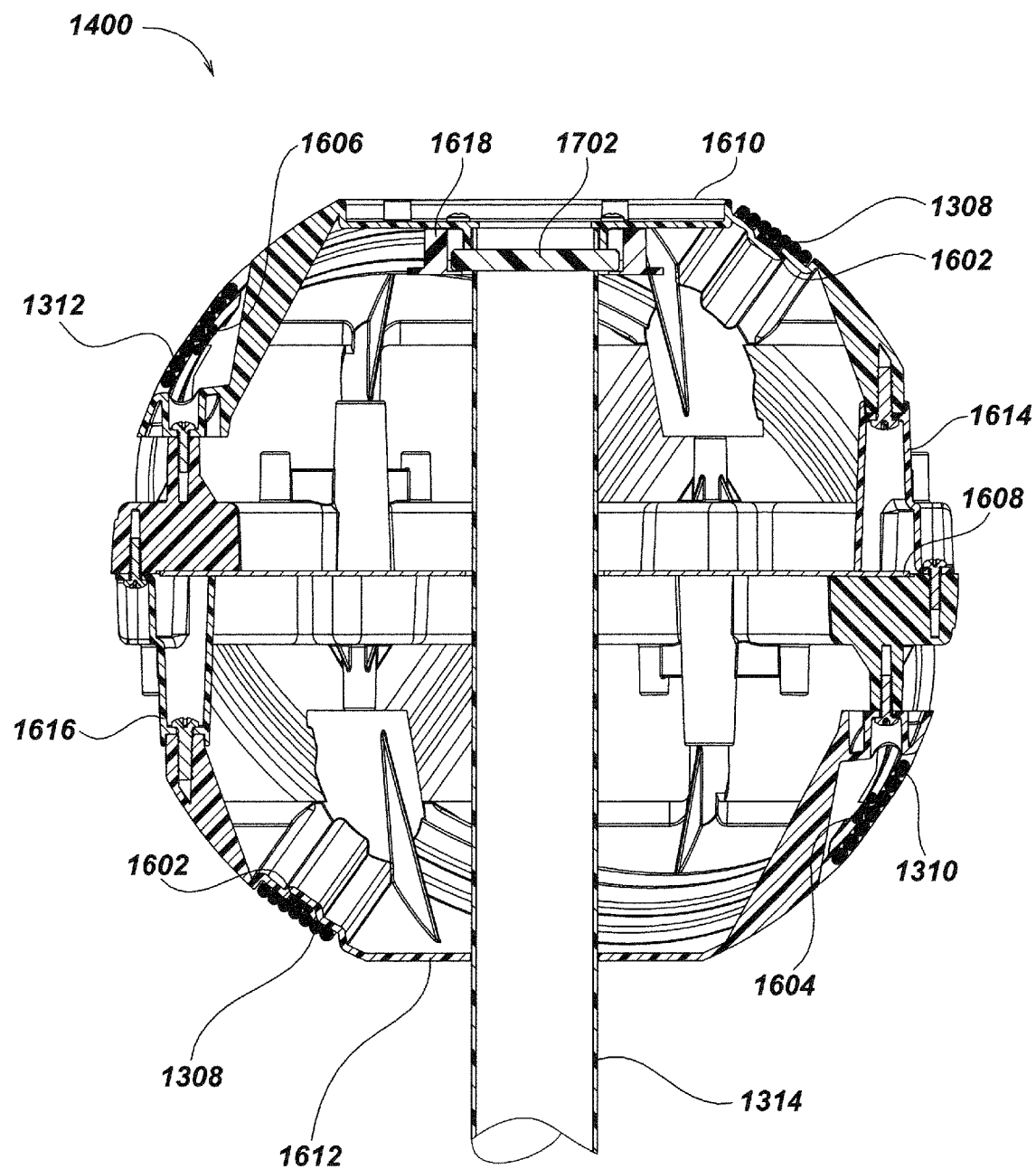
FIG. 16 is a section view of the sonde beacon assembly of FIG. 14, taken from line 16-16 of FIG. 15.

Turning to FIG. 16, a section view reveals secondary windings which may be centered under each set of primary antenna coil windings, and which may use a smaller diameter wire. In an exemplary embodiment, the secondary windings may be three windings wide, for example. There may be a three-strand first secondary coil 1602 centrally located under the first primary coil 1308; a similar second secondary coil 1604 may be centrally located under second primary coil 1310; and a third secondary coil 1606 centrally located under third primary coil 1312. A beacon PCB 1608 may be horizontally seated at the equator of the sonde beacon antenna assembly 1400 to provide electrical connection and control circuitry. The support structure 1306 (FIG. 13) may be built up, for example, from a coil retainer top 1610 and a coil retainer bottom 1612 each of which attaches to a PCB mount such as upper PCB mount 1614 and lower PCB mount 1616. A formed tube retainer 1618 may be attached to the coil retainer top 1610 to secure the mast 1314.

In use, current in the windings of the first primary coil 1308 induces voltage in the first secondary coil 1602. Current in the windings of second primary coil 1310 induces voltage in the second secondary coil 1604. Current in the windings of the third primary coil 1312 induces voltage in the third secondary coil 1606. The combination of a primary coil and a secondary coil acts as a step-up transformer producing a high voltage in the secondary coil dependent on the number of windings and wire diameters and kinds employed.

Current may be switched to the first primary coil 1308, the second primary coil 1310 and the third primary coil 1312 under the control of circuitry mounted on the beacon PCB 1608 at chosen frequencies. The frequency used in a primary coil will be inducted into the secondary coil beneath it. The use of Litz wire for both primary and secondary windings serves to increase the Q factor of the inductor thus formed. The fields emanating from the several secondary coils will therefore each have a unique signature in frequency and vectors.

The signals induced into and emanating from the secondary coils may be varied by frequency, time, or phase, in a variety of schemes depending on the intended application. The use of multiple coils at separate frequencies may provide an advantage, for example, in compensating for local distortions which may be frequency dependent.

The ability of the locating receiver 1210 (FIG. 12A) to discriminate frequencies and vectors of detected fields allows for a system of refining the computed location of a given detection of an underground conductor to a higher order of precision by processing three separate signals through separate filters. Multiple frequencies may be used on different coils, simultaneously or in series, increasing the number of channels of information provided by the locator for a given moment in time.

An example of a multi-frequency beacon transmission scheme demonstrates this advantage. In Table 2, three coils are used, and three frequencies are transmitted for a single time interval, followed by a pause in transmission. The frequencies are then shifted by one coil, and the three frequencies are again transmitted for a second time interval. Three transmitting coils, using three frequencies, provide nine channels (three coils×three frequencies) in this exemplary transmission scheme. The signals represented in Table 2 may be GPS time synchronized as taught in U.S. patent application Ser. No. 13/570,211, entitled PHASE-SYNCHRONIZED BURIED OBJECT LOCATOR APPARATUS, SYSTEMS, AND METHODS, filed Aug. 8, 2011, the content of which is incorporated herein.

TABLE 2

Example Frequency Scheme

| Time   | 0-200 ms | 200-300 ms | 300-500 ms | 500-600 ms | 600-800 ms | 800-1000 ms |
|--------|----------|------------|------------|------------|------------|-------------|
| COIL 1 | 30 kHz   | —          | 480 kHz    | —          | 120 kHz    | —           |
| COIL 2 | 120 kHz  | —          | 30 kHz     | —          | 480 kHz    | —           |
| COIL 3 | 480 kHz  | —          | 120 kHz    | —          | 30 kHz     | —           |

Other frequency, phase, and/or time-varied schema may be used in various embodiments.

Figure 17:
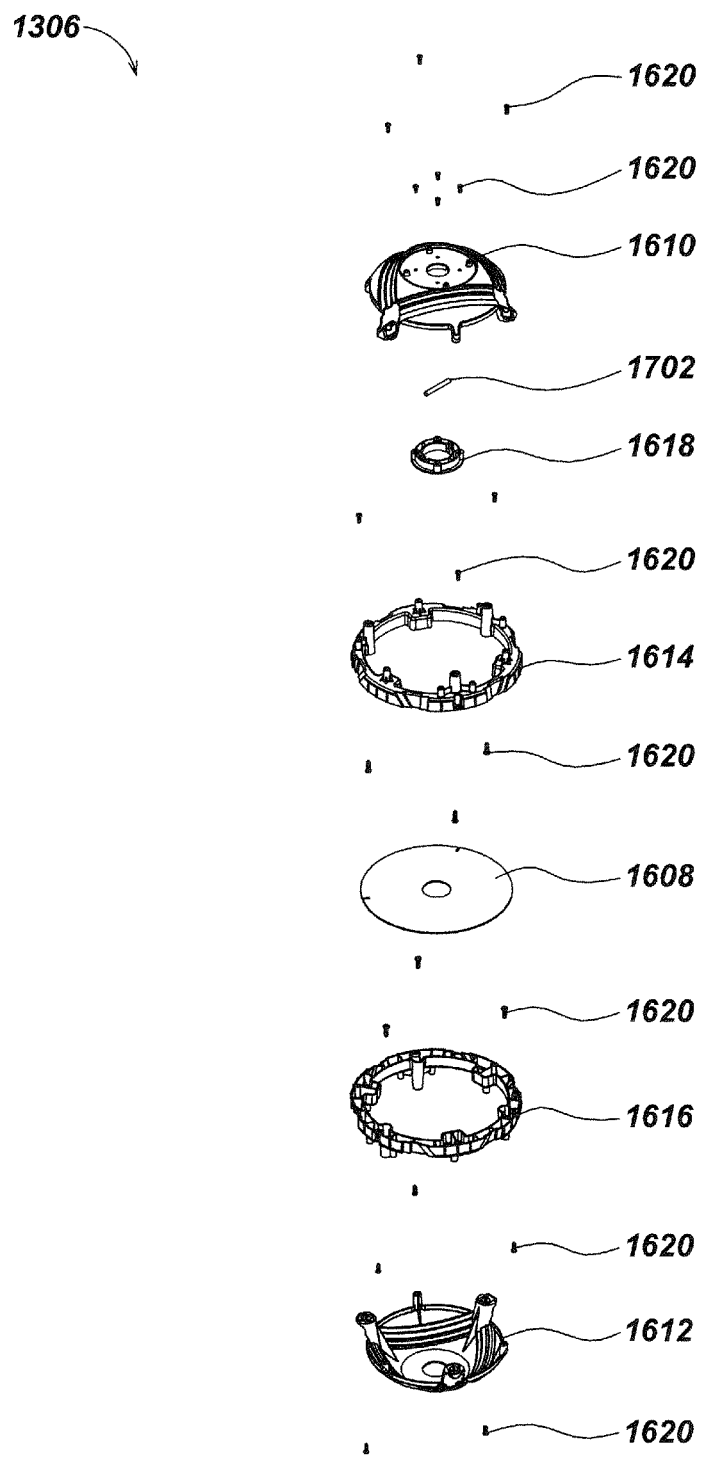
FIG. 17 is an exploded view of the support structure embodiment of FIG. 13.

Referring now to FIG. 17, in an exploded view of the support structure 1306 of sonde beacon 1400 (FIG. 14), the coil retainer top 1610 may be joined to the upper PCB mount 1614 by screws such as 1620. The tube retainer 1618 may be attached to the coil retainer top 1610 in similar fashion. A tube retaining pin 1702 may anchor the tube of the mast 1314 (FIG. 13) to the support structure 1306. The upper PCB mount 1614 and the lower PCB mount 1616 may retain the beacon PCB 1608 between them and may be similarly joined using screws such as 1620. The coil retainer bottom 1612 may be attached similarly to the lower PCB mount 1616.

In one aspect of the present disclosure, a sonde beacon as described may be used as a stationery beacon in relation to a locating receiver, positioned in a known location to assist in mapping locations during a locate operation, for example. The sonde-beacon shown may be deployed in a stand-alone housing, for example, to broadcast a navigation signal to a mapping locator from a fixed location at a job site, for example, or in other applications where a unique signal beacon is desirable.

For example, in one aspect of the present disclosure, a signal beacon may be mounted to a locating transmitter to aid in locational navigation.

Figure 18:
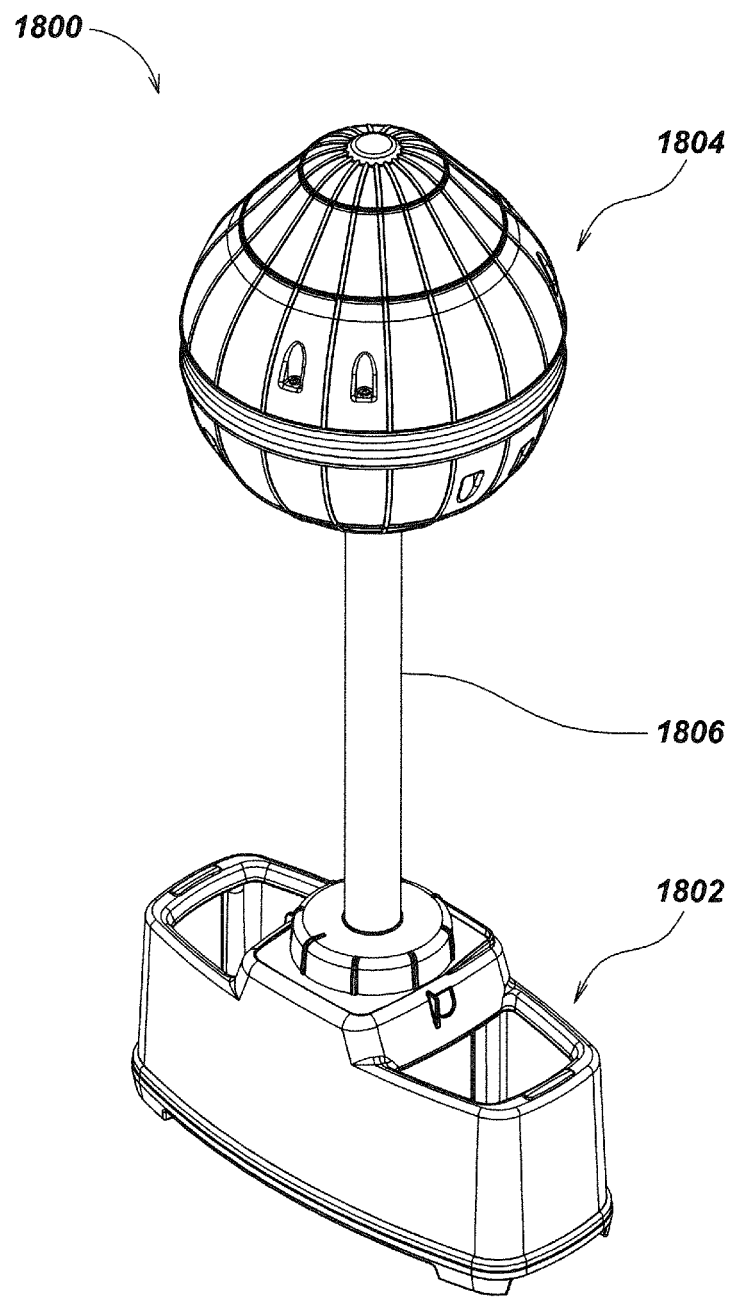
FIG. 18 illustrates an embodiment of a sonde beacon configured with a locating transmitter.

Referring to FIG. 18 a locating transmitter and beacon system embodiment 1800 may include a locating transmitter 1802, a sonde beacon 1804 and a supporting mast 1806. The sonde beacon 1804 may also incorporate an antenna assembly 100 (FIGS. 1-7, and 13) for receiving positional information such as from satellites, for example. The transmitter 1802 may be used in, for example, an inductive mode in which it generates field energy into the earth in order to energize any buried conductors in the immediate area for detection by a locator. Alternatively, it may be used in direct-connect fashion by direct connection by means of clips or a clamp to an accessible portion of a buried conductor such as, for example, the meter connected to a buried gas line. A beacon such as 1804 may provide a recognizable signal pattern to a locating receiver and enable the exact location and distance of the transmitter relative to the receiver to be calculated and incorporated into a mapping system, for example. An LED flashing ring may optionally be mounted to the mast 1806.

In an exemplary embodiment, an LED array may be used as a warning and safety alert signal may be incorporated into a locating receiver or other man-portable device to enhance the safety of an operator.

Figure 19:
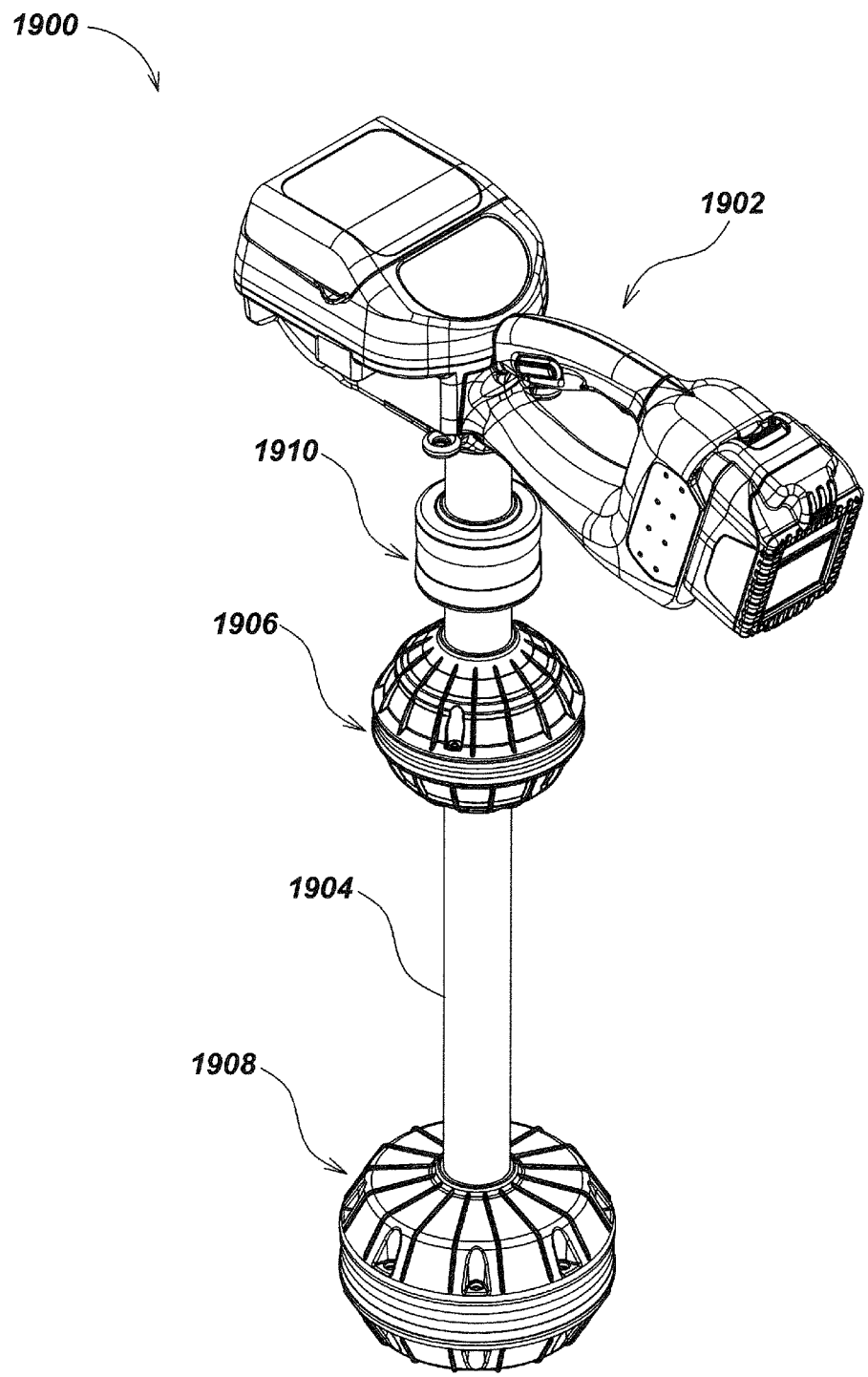
FIG. 19 illustrates an embodiment of a locator configured with a safety flasher ring.

Referring to FIG. 19, an exemplary embodiment of a locator 1900 configured with a safety flasher ring 1910 is illustrated. A locator receiver 1900 may include a locator body 1902, a mast tube 1904, an upper antenna module 1906, a lower antenna module 1908, and a safety flasher ring 1910.

Figure 20:
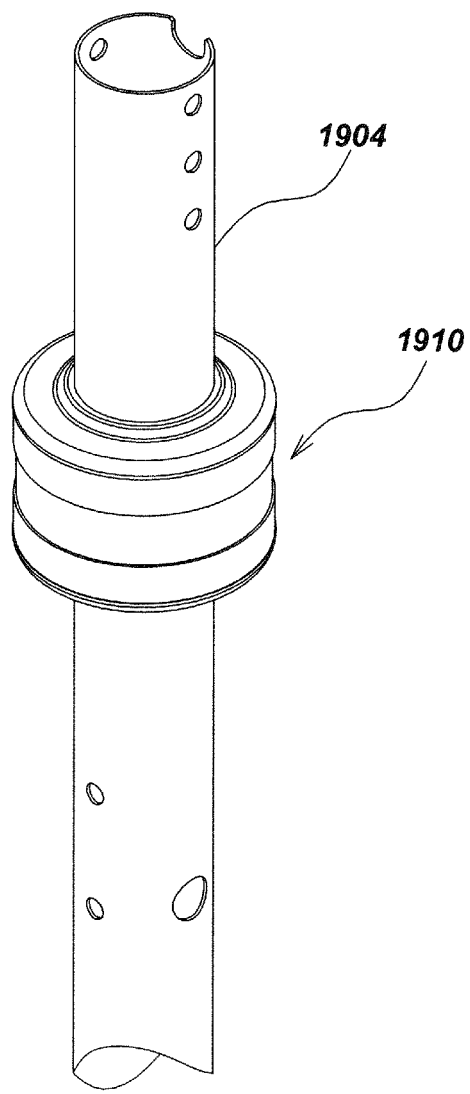
FIG. 20 illustrates details of the safety flasher ring embodiment of FIG. 19.

Referring to FIG. 20, the flasher ring 1910 is seen positioned on the mast tube 1904.

Figure 21:
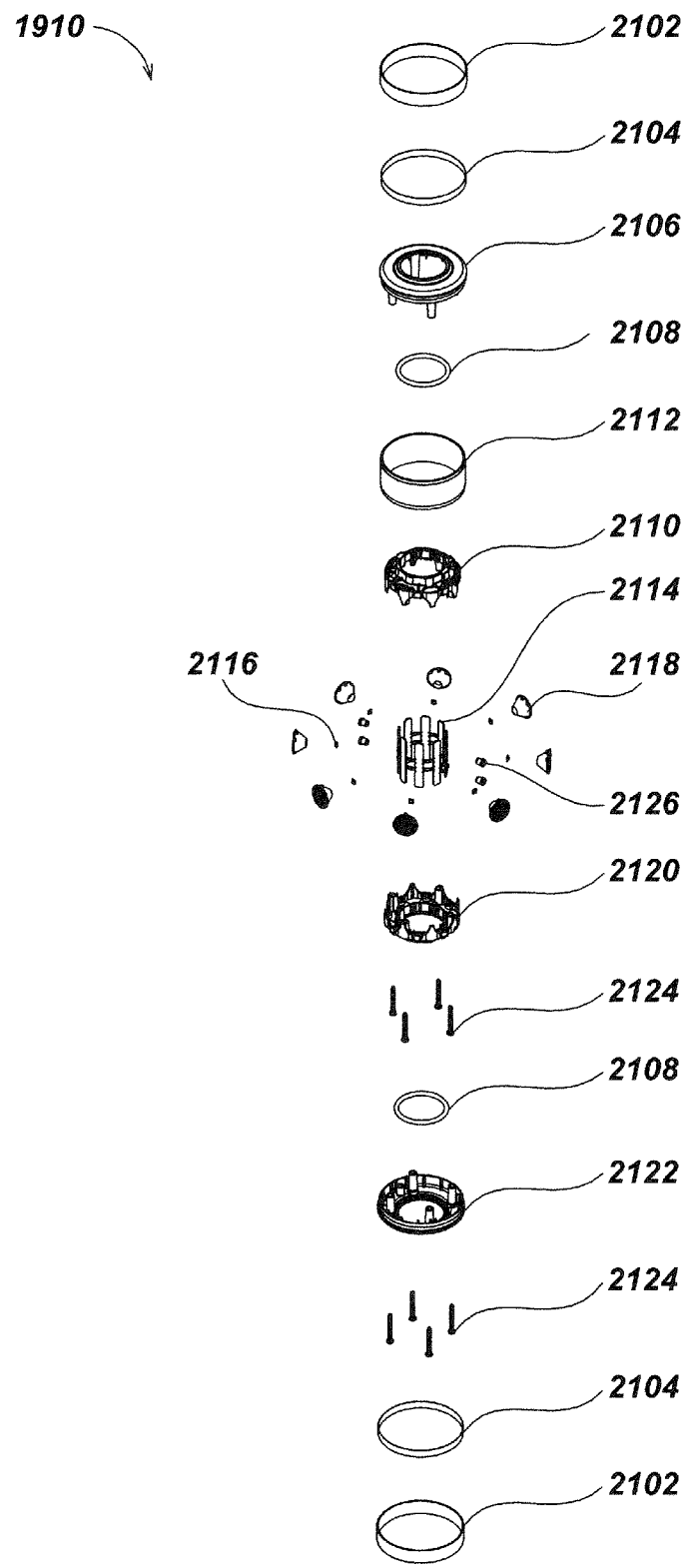
FIG. 21 is an exploded view of the safety flasher ring embodiment of FIG. 19, illustrating details thereof.

Referring to FIG. 21, in an exploded view, an example of a safety flasher ring 1910 has an outer adhesive label of reflective tape 2102 positioned outside an inner ring of sealing tape 2104 which seals the junction between a formed upper shell 2106 and the upper edge of a circular window 2112. An upper O-ring 2108 seals the junction of the top shell 2106 around the mast tube (1904 in FIG. 19). Within the circular transparent window 2112 an upper PCB holder 2110 and a matching lower PCB holder 2120 may be seated around the mast tube (1904 in FIG. 19). An interior PCB form 2114 may be centrally fitted around the mast tube (1904 in FIG. 19). In this exemplary embodiment an array of eight LED lamps such as 2116 are fitted to individual LED PCBs printed on the panels of the PCB form 2014. The PCB form may be formed of aluminum to aid heat dissipation, and the circuits supporting the energizing of individual LEDs may be printed on the panels of the PCB form in copper, for example. For example, Cree XPE Red "X-Lamp" LEDs may be used as available from Cree Optics of Durham, N.C. Each LED lamp 2116 may be fitted with an elliptical optical reflector 2118 such as, for example, the Elliptical Orthogonal TIR Reflector #10198 available from Carclo Technical Plastics of Slough, Berkshire, U.K. A lower O-ring 2108 and a lower shell 2122 similarly sealed with a ring of sealing tape 2104 may be similarly fitted to the mast tube (1904 in FIG. 19). The lower shell 2122 and upper shell 2106 may be attached by means of screws such as 2124, and the lower PCB holder 2120 and upper PCB holder 2110 may similarly be connected using screws such as 2124 or similar attachment means. Plastic rivets 2126 may be used to attach the assembly to the mast tube (1904 in FIG. 19). A ring of sealing tape 2104 similarly seals the lower shell 2122 which supports a lower ring of reflective tape 2102.

When used with a man-portable locator such as 1900 (FIG. 19) the safety flasher device 1910 may be powered by electrical connection to the locator battery and the flashing of the individual LEDs controlled by software on board the locator 1900 (FIG. 19). A light sensor may be used to modulate the LED drivers to adjust the LED brightness depending on a measurement of ambient light in the locating environment.

Other applications using the safety flasher device may be designed for any manportable device where a flashing safety warning would be of benefit.

Figure 22:
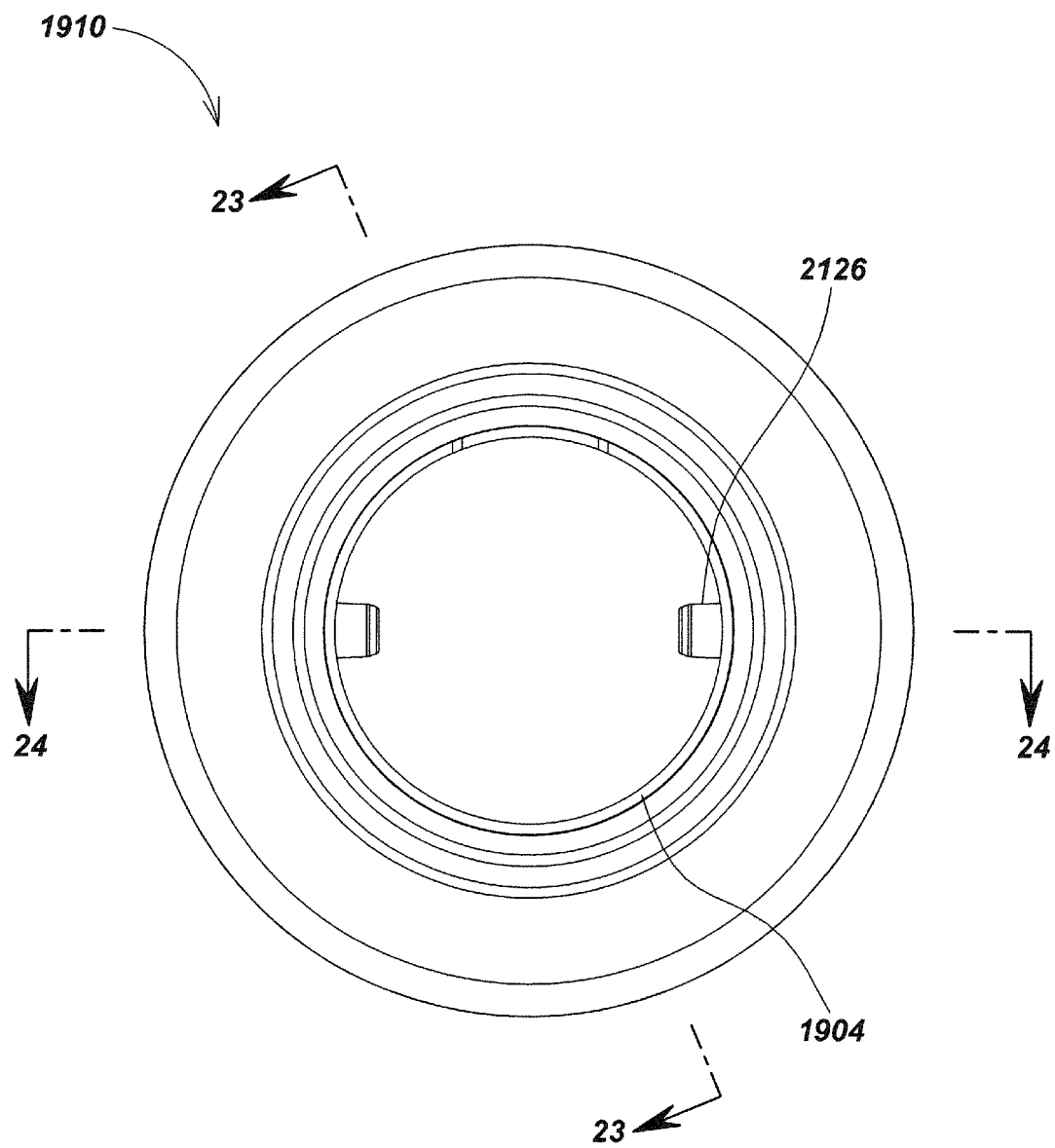
FIG. 22 is a top view of the safety flasher ring embodiment of FIG. 19, illustrating details thereof.
Figure 23:
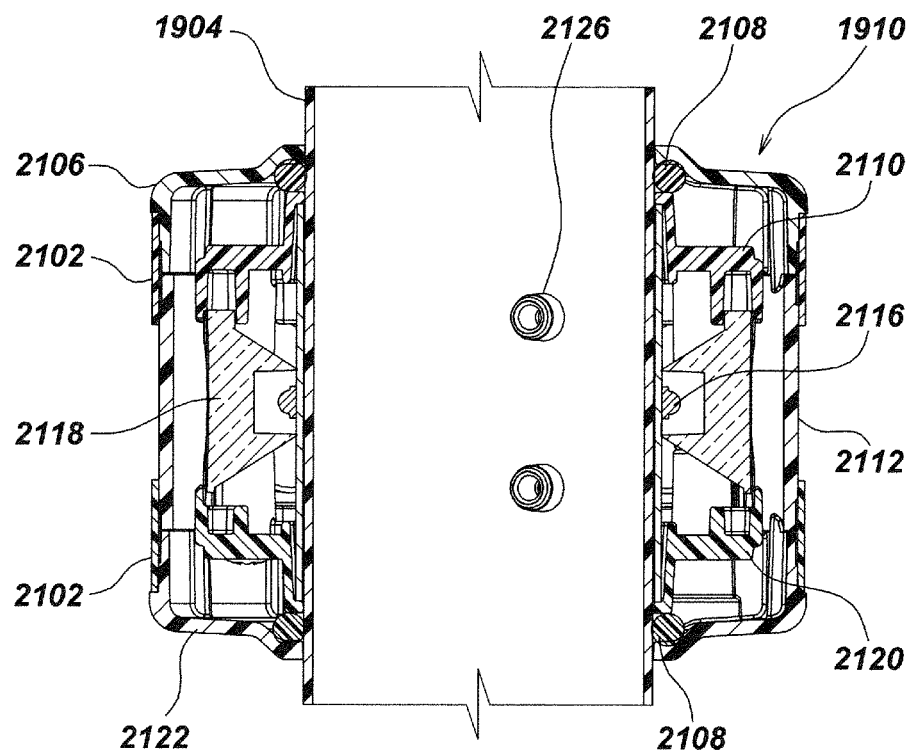
FIG. 23 is a section view of the safety flasher ring embodiment of FIG. 19, taken from line 23-23 of FIG. 22.
Figure 24:
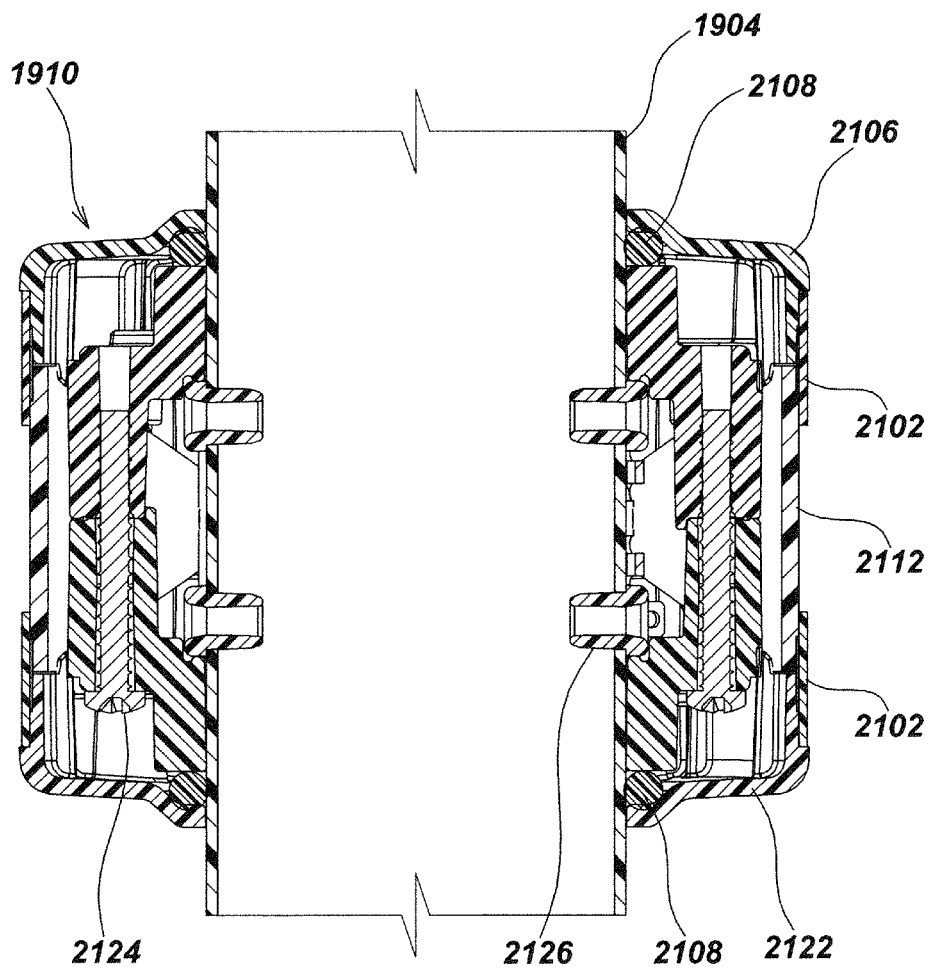
FIG. 24 is a section view of the safety flasher ring embodiment, taken from line 24-24 of FIG. 22.

Referring to FIGS. 22, 23, and 24, additional views illustrate the exemplary embodiment of the safety flasher device as described above.

Figure 25:
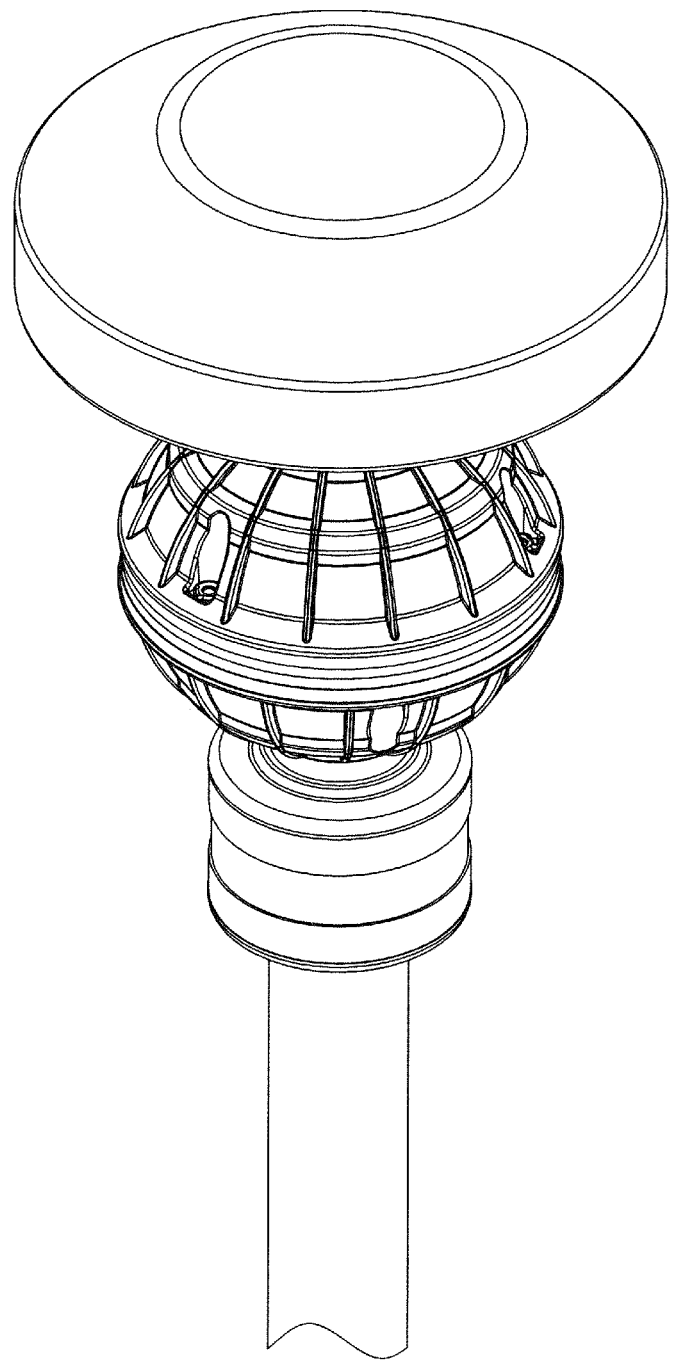
FIG. 25 illustrates another embodiment illustrating a safety ring flasher with a GPS antenna pole.

FIG. 25 illustrates another embodiment illustrating a safety ring flasher with a GPS antenna pole. This embodiment may be used in various devices, such as those described previously herein, in applications where visual safety indications are useful or required.

In various embodiments, aspects, details, apparatus, systems, processes, methods, and/or functions as described in the following documents, which are incorporated by reference herein, may be used in conjunction with the disclosed aspects herein. These documents include "GPS Multipath Mitigation Using a Three Dimensional Phased Array," Brown and Matthews, NAVSYS Corporation, Proceedings of ION GNSS 2005, Long Beach, Calif., September 2005; "GPS Signal Analysis using LHCP/RHCP Antenna and Software GPS Receiver", Dinesh Manandhar, Ryosuke Shibasaki, Centre for Spatial Information Science, The University of Tokyo, Japan, and Per-Ludvig Normark, Nordnav Technologies, Sweden; "Novel Multipath Mitigation Methods using a Dual-polarization Antenna", Paul D Groves, Ziyi Jiang, Benjamin Skelton, Paul A Cross, University College London, United Kingdom, Lawrence Lau, Institut De Geomatica, Barcelona, Spain, and Yacine Adane and Izzet Kale, University of Westminster, London, United Kingdom, 23rd International Technical Meeting of the Satellite Division of The Institute of Navigation, Portland, Oreg., Sep. 21-24, 2010; "Parameterization of GPS L1 Multipath Using a Dual Polarized RHCP/LHCP Antenna", Ashkan Izadpanah, January 2009, UCGE Reports Number 20280, Department of Geomatics Engineering, University of Calgary, Alberta, Canada; "Enhanced GNSS Signal Detection Performance Utilizing Polarization Diversity", Mohammadreza Zaheri, January 2011, UCGE Reports Number 20322, Department of Geomatics Engineering, University of Calgary, Alberta, Canada; Yang, Chun, Porter, Alec, "GPS Multipath Estimation and Mitigation Via Polarization Sensing Diversity: Parallel Iterative Cross Cancellation," Proceedings of the 18th International Technical Meeting of the Satellite Division of The Institute of Navigation (ION GNSS 2005), Long Beach, Calif., September 2005, pp. 2707-2719.

In one or more exemplary embodiments, the electronic functions, methods and processes described herein and associated with transmitters and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to camera and lighting elements may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the invention. Various modifications to these aspects will be readily apparent to those skilled in the art, and the generic principles de-fined herein may be applied to other aspects without departing from the spirit or scope of the invention. Thus, the presently claimed inven-

We claim:

1. A buried utility locating system, comprising:
an electronic locating receiver for locating a buried utility based on sensing and processing magnetic field signals emitted from the buried utility;
a GPS antenna array including a left hand polarized antenna structure including a left vane and left ramp for receiving a left hand circularly polarized GPS signal and a right hand polarized antenna structure including a right vane and a right ramp for receiving a right hand circularly polarized GPS signal; a GPS receiver module coupled to GPS antenna array outputs for providing information associated with a position of the electronic locating receiver; and a transmitting sonde beacon positioned coaxially with a center point of the GPS antenna array;
wherein the sonde beacon transmits a magnetic field signal for detection by the electronic locating receiver and the electronic locating receiver determines a distance from the GPS antenna array to the locator and a distance from the locator to the buried utility and combines the two depth calculations to determine an offset from the GPS antenna position.

2. A buried utility locating system, comprising:
an electronic locating receiver circuit for locating a buried utility based on sensing and processing magnetic field signals emitted from the buried utility to determine a position of a buried utility;
a GPS receiver module; and
a GPS antenna coupled to the receiver module;
wherein the GPS antenna comprises:
an antenna array including multiple conductive antenna elements comprising at least two antennas having antenna elements configured for receiving a right hand circularly polarized GPS signal and a left hand circularly polarized GPS signal;
wherein the array of orthogonal antenna conductive antenna elements includes elements disposed at two or more different heights above a ground plane:
a supporting element;
a standoff conductive element; and
a ground plane; and
a transmitting sonde beacon positioned coaxially with a common center of the GPS antenna array.

3. The locating system of claim 1, wherein the locator includes at least one flashing light configured as a safety warning device.

4. The locating system in claim 1, further including a mast configured to support the GPS antenna.

5. The locating system of claim 4, wherein the mast includes at least one flashing light configured as a safety warning device.

6. The locating system of claim 2, wherein at least one element of the antenna array is a tunable element, and wherein a reception beam of the antenna is tunable by physical adjustment of the at least one element.

7. The locating system of claim 6, wherein, wherein the beam is tuned electronically.

8. The locating system of claim 6, wherein the beam is tuned automatically based on a computer control signal.

9. The locating system of claim 1, wherein the GPS antenna provides to the receiver:
a first output signal responsive to the right hand circularly polarized GPS signal; and
a second output signal responsive to the left hand circularly polarized GPS signal; and
wherein the information associated with a position of the locating receiver is based on both the first output signal and the second output signal.

10. The locating system of claim 9, wherein the first left hand polarized antenna structure and the right hand polarized antenna structure are co-located.

11. The locating system of claim 1 or claim 2, further comprising a sonde beacon.

12. The locating system of claim 1 or claim 2, wherein the GPS antenna array comprises:
a molded support form including the ramped vane structures;
a ground plane attached to the support form;
a plurality of conductive wires positioned on the ramps of the vane structures and electrically connected to a plurality of coaxial conductors.

13. The locating system of claim 12, wherein the plurality of coaxial conductors comprise an upper coaxial conductor and a lower coaxial conductor.

14. The locating system of claim 13, wherein a first conductor of the upper coaxial conductor and a first conductor of the lower coaxial conductor are electrically coupled to the ground plane, and wherein a second conductor of the upper coaxial conductor and a second conductor of the lower coaxial conductor are electrically coupled to corresponding signal takeoff connectors of the GPS antenna array left hand polarized antenna structure and right hand antenna polarized structure.

15. The locating system of claim 1, wherein the sonde beacon transmits on two or more frequencies and the locating receiver is configured to receive signals from the sonde beacon at the two or more frequencies.

16. The locating system of claim 2, wherein the sonde beacon transmits on two or more frequencies and the locating receiver is configured to receive signals from the sonde beacon at the two or more frequencies.

* * * * *